US009690531B2

(12) United States Patent
Kawaura

(10) Patent No.: US 9,690,531 B2
(45) Date of Patent: Jun. 27, 2017

(54) SYSTEM, A DEVICE, AND A METHOD FOR NOTIFYING AN INFORMATION PROCESSING APPARATUS OF AT LEAST ONE OF A PRIVATE EVENT AND A PUBLIC EVENT

(71) Applicant: CANON KABUSHIKI KAISHA, Tokyo (JP)

(72) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/157,361

(22) Filed: Jan. 16, 2014

(65) Prior Publication Data

US 2014/0198346 A1    Jul. 17, 2014

(30) Foreign Application Priority Data

Jan. 17, 2013    (JP) ................................. 2013-006149

(51) Int. Cl.
*G06F 3/12*    (2006.01)
(52) U.S. Cl.
CPC ............ *G06F 3/1296* (2013.01); *G06F 3/121* (2013.01); *G06F 3/1229* (2013.01); *G06F 3/1285* (2013.01)
(58) Field of Classification Search
CPC ...... G06F 3/121; G06F 3/1294; G06F 3/1229; G06F 3/1285; G06F 3/1296; H04N 1/00127

USPC .................................................. 358/1.15, 1.1
See application file for complete search history.

(56) References Cited

U.S. PATENT DOCUMENTS

| 5,800,081 | A * | 9/1998 | Teradaira et al. ................ 400/74 |
| 6,615,297 | B1* | 9/2003 | Beard ................... G06F 3/1204 |
|  |  |  | 382/276 |
| 2007/0233736 | A1* | 10/2007 | Xiong ..................... G06Q 30/02 |
| 2009/0231637 | A1* | 9/2009 | Kemmochi ........ H04N 1/00206 |
|  |  |  | 358/474 |
| 2010/0106829 | A1* | 4/2010 | Mukaiyama et al. ........ 709/224 |
| 2015/0074191 | A1* | 3/2015 | Feng ...................... H04L 67/26 |
|  |  |  | 709/204 |

FOREIGN PATENT DOCUMENTS

| JP | 7-137358 A | 5/1995 |
| JP | 2008-250965 A | 10/2008 |

* cited by examiner

*Primary Examiner* — Iriana Cruz
(74) *Attorney, Agent, or Firm* — Canon USA, Inc. I.P. Division

(57) ABSTRACT

When a device notifies a first information processing apparatus and a second information processing apparatus of information, the device notifies the first information processing apparatus of first information and second information, and notifies the second information processing apparatus of the first information without the second information.

11 Claims, 22 Drawing Sheets

FIG.6A

```
<wsdst:GetPrinterElementsRequest> ~601
  <wsdst:RequestedElements> ~602
    <wsdst:Name>ihv:InkErrorDetails</wsdst:Name> ~603
    <wsdst:Requirements param="Id">11111111</wsdst:Requirements> ~604
    <wsdst:Requirements param="Listener">Requester Only</wsdst:Requirements> ~605
    <wsdst:Requirements param="period">Begin</wsdst:Requirements> ~606
  </wsdst:RequestedElements>
</wsdst:GetPrinterElementsRequest>
```

FIG.6B

```
<wsdst:GetPrinterElementsResponse> ~620
  <wsdst:ElementData Name="ihv:InkErrorDetails" Valid="true"> ~621
    <ihv:InkErrorDetails> ~622
      <ihv:Entry name="Cyan">
        <ihv:InkState>None</ihv:InkState>
      </ihv:Entry>
      <ihv:Entry name="Magenta">
        <ihv:InkState>Low</ihv:InkState>
        <ihv:message><![CDATA[Ink is low.]]></ihv:message>
        <ihv:Icon>Exclamation</ihv:Icon>
        <ihv:SupportCode>W1000</ihv:SupportCode>
      </ihv:Entry>
      <ihv:Entry name="Yellow">
        <ihv:InkState>None</ihv:InkState>
      </ihv:Entry>
      <ihv:Entry name="Black"> ~623
        <ihv:InkState>Out</ihv:InkState> ~624
        <ihv:Message><![CDATA[Ink has run out.]]></ihv:Message> ~625
        <ihv:Icon>Cross</ihv:Icon> ~626
        <ihv:SupportCode>E2000</ihv:SupportCode> ~627
      </ihv:Entry>
    </ihv:InkErrorDetails>
  </wsdst:ElementData>
</wsdst:GetPrinterElementsResponse>
```

FIG.6C

```
<wsdst:GetPrinterElementsRequest>
  <wsdst:RequestedElements>
    <wsdst:Name>ihv:InkErrorDetails</wsdst:Name>
    <wsdst:Requirements param="Id">11111111</wsdst:Requirements> ~610
    <wsdst:Requirements param="Listener">Requester Only</wsdst:Requirements>
    <wsdst:Requirements param="period">End</wsdst:Requirements> ~611
  </wsdst:RequestedElements>
</wsdst:GetPrinterElementsRequest>
```

FIG.6D

```
<wsdst:GetPrinterElementsRequest>
  <wsdst:RequestedElements>
    <wsdst:Name>ihv:InkErrorDetailIs</wsdst:Name>
    <wsdst:Requirements param="d">11111111</wsdst:Requirements>
    <wsdst:Requirements param="Listener">Requester Only</wsdst:Requirements>
    <wsdst:Requirements param="period">Once</wsdst:Requirements> ~630
  </wsdst:RequestedElements>
</wsdst:GetPrinterElementsRequest>
```

FIG.8A

| PRIVATE ELEMENT MANAGEMENT TABLE | | | |
|---|---|---|---|
| ELEMENT | LISTENER | PERIOD | APPLICATION ID |
| InkErrorDetails | INFORMATION PROCESSING APPARATUS xxx | Begin | 11111111 |// 801 / 802 / 803 / 804

FIG.8B

| PRIVATE ELEMENT MANAGEMENT TABLE | | | |
|---|---|---|---|
| ELEMENT | LISTENER | PERIOD | APPLICATION ID |
| InkErrorDetails | INFORMATION PROCESSING APPARATUS xxx | Begin | 11111111 |
| | | | 22222222 |

```
<wsdst:PrinterElementsChangeEvent>  ~1000
  <wsdst:PrinterConfigration>  ~1001
    <wsdst:ConsumableEntry Name="Cyan">
      <wsdst:Color>Cyan</wsdst:Color>
      <wsdst:Level>70</wsdst:Level>
      <wsdst:Model>Km-10</wsdst:Model>
    </wsdst:ConsumableEntry>
    <wsdst:ConsumableEntry Name="Magenta">
      <wsdst:Color>Magenta</wsdst:Color>
      <wsdst:Level>10</wsdst:Level>
      <wsdst:Model>Km-20</wsdst:Model>
    </wsdst:ConsumableEntry>
    <wsdst:ConsumableEntry Name="Yellow">
      <wsdst:Color>Yellow</wsdst:Color>
      <wsdst:Level>100</wsdst:Level>
      <wsdst:Model>Km-40</wsdst:Model>
    </wsdst:ConsumableEntry>
    <wsdst:ConsumableEntry Name="Black">        ~1002
      <wsdst:Color>Black</wsdst:Color>          ~1003
      <wsdst:Level>0</wsdst:Level>  ~1004
      <wsdst:Model>Km-01</wsdst:Model>          ~1005
    </wsdst:ConsumableEntry>
  </wsdst:PrinterConfiguration>
</wsdst:PrinterElementsChangeEvent>
```

FIG.10B

```
<wsdst:PrinterElementsChangeEvent>  ~1010
  <ihv:InkErrorDetails>  ~1011
    <ihv:Entry name="Cyan">
      <ihv:InkState>None</ihv:InkState>
    </ihv:Entry>
    <ihv:Entry name="Magenta">
      <ihv:InkState>Low</ihv:InkState>
      <ihv:Icon>Exclamation</ihv:Icon>
      <ihv:message><![CDATA[Ink is low.]]></ihv:message>
      <ihv:SupportCode>W1000</ihv:SupportCode>
    </ihv:Entry>
    <ihv:Entry name="Yellow">
      <ihv:InkState>None</ihv:InkState>
    </ihv:Entry>                                    1014
    <ihv:Entry name="Black">  ~1012
      <ihv:InkState>Empty</ihv:InkState>  ~1013
      <ihv:message><![CDATA[Ink is empty.]]></ihv:message>
      <ihv:Icon>Cross</ihv:Icon>        ~1015
      <ihv:SupportCode>E3000</ihv:SupportCode>
    </ihv:Entry>
  </ihv:InkErrorDetails>            1016
</wsdst:PrinterElementsChangeEvent>
```

FIG.10C

```
<wsdst:PrinterElementsChangeEvent> ~1000
  <wsdst:PrinterConfiguration> ~1001
    <wsdst:ConsumableEntry Name="Cyan">
      <wsdst:Color>Cyan</wsdst:Color>
      <wsdst:Level>70</wsdst:Level>
      <wsdst:Model>Km-10</wsdst:Model>
    </wsdst:ConsumableEntry>
    <wsdst:ConsumableEntry Name="Magenta">
      <wsdst:Color>Magenta</wsdst:Color>
      <wsdst:Level>10</wsdst:Level>
      <wsdst:Model>Km-20</wsdst:Model>
    </wsdst:ConsumableEntry>
    <wsdst:ConsumableEntry Name="Yellow">
      <wsdst:Color>Yellow</wsdst:Color>
      <wsdst:Level>100</wsdst:Level>
      <wsdst:Model>Km-40</wsdst:Model>
    </wsdst:ConsumableEntry>
    <wsdst:ConsumableEntry Name="Black"> ~1002
      <wsdst:Color>Black</wsdst:Color> ~1003
      <wsdst:Level>0</wsdst:Level> ~1004
      <wsdst:Model>Km-01</wsdst:Model> ~1005
    </wsdst:ConsumableEntry>

<ihv:InkErrorDetails> ~1011
    <ihv:Entry name="Cyan">
      <ihv:InkState>None</ihv:InkState>
    </ihv:Entry>
    <ihv:Entry name="Magenta">
      <ihv:InkState>Low</ihv:InkState>
      <ihv:Icon>Exclamation</ihv:Icon>
      <ihv:message><![CDATA[Ink is low.]]></ihv:message>
      <ihv:SupportCode>W1000</ihv:SupportCode>
    </ihv:Entry>
    <ihv:Entry name="Yellow">
      <ihv:InkState>None</ihv:InkState>
    </ihv:Entry>
                                        1014
    <ihv:Entry name="Black"> ~1012
      <ihv:InkState>Empty</ihv:InkState> ~1013
      <ihv:message><![CDATA[Ink is empty.]]></ihv:message>
      <ihv:Icon>Cross</ihv:Icon> ———1015
      <ihv:SupportCode>E3000</ihv:SupportCode>
    </ihv:Entry>
  </ihv:InkErrorDetails>               1016
</wsdst:PrinterElementsChangeEvent>
```

FIG.10D

```
<wsdst:PrinterElementsChangeEvent> ~1021
  <ihv:PrintProgressDetails> ~1022
    <ihv:JobState>         ~1023
      <ihv:JobStatus>Processing</ihv:JobStatus> 1024
      <ihv:SupportCode>None</ihv:SupportCode>
      <ihv:Message><![CDATA[Printing.]]></ihv:Message>
      <ihv:JobName><![CDATA[Report.txt]]></ihv:JobName>
    </ihv:JobState>
    <ihv:Progress>
      <ihv:TotalPages>5</ihv:TotalPages>
      <ihv:PrintedPages>2</ihv:PrintedPages> ~1025
      <ihv:PageState>Ejecting</ihv:PageState> ~1026
    </ihv:Progress>
  </ihv:PrintProgressDetails>
</wsdst:PrinterElementsChangeEvent>
```

```
wsdts: PUBLIC ELEMENT
ihv: PRIVATE ELEMENT
```

FIG.11

```
<wsdst:GetPrinterElementsRequest>
 <wsdst:RequestedElements>
  <wsdst:Name>ihv:InkErrorDetails</wsdst:Name>
  <wsdst:Requirements param="Id">11111111</wsdst:Requirements>
  <wsdst:Requirements param="Listener">Requester Only</wsdst:Requirements>
  <wsdst:Requirements param="period">60000</wsdst:Requirements>
 </wsdst:RequestedElements>
</wsdst:GetPrinterElementsRequest>
```

| PRIVATE ELEMENT MANAGEMENT TABLE |||||
|---|---|---|---|
| ELEMENT | LISTENER | PERIOD | APPLICATION ID |
| InkErrorDetails | INFORMATION PROCESSING APPARATUS xxx | 60000 | 11111111 |

| PRIVATE ELEMENT MANAGEMENT TABLE |||||
|---|---|---|---|
| ELEMENT | LISTENER | PERIOD | APPLICATION ID |
| InkErrorDetails | INFORMATION PROCESSING APPARATUS xxx | 60000 | 11111111 |
| | | 500 | 22222222 |

```
<wsdst:GetPrinterElementsRequest>
 <wsdst:RequestedElements>
  <wsdst:Name>ihv:PrintProgressDetails</wsdst:Name> ~1601
  <wsdst:Requirements param="Id">33333333</wsdst:Requirements> ~1602
  <wsdst:Requirements param="Listener">Requester Only</wsdst:Requirements> ~1603
  <wsdst:Requirements param="period">Printing</wsdst:Requirements> ~1604
 </wsdst:RequestedElements>
</wsdst:GetPrinterElementsRequest>
```

FIG.16B

```
<wsdst:GetPrinterElementsResponse> ~1611
 <wsdst:ElementData Name="ihv:PrintProgressDetails" Valid="true"> ~1612
  <ihv:PrintProgressDetails> ~1613
   <ihv:JobState> ~1614
    <ihv:JobStatus>Receiving</ihv:JobStatus> ~1615        1617
    <ihv:SupportCode>None</ihv:SupportCode> ~1616
    <ihv:Message><![CDATA[Printer has received your print job.]]></ihv:Message>
    <ihv:JobName><![CDATA[Report.txt]]></ihv:JobName> ~1618
   </ihv:JobState>
   <ihv:Progress> ~1619
    <ihv:TotalPages>5</ihv:TotalPages> ~1620
    <ihv:PrintedPages>0</ihv:PrintedPages> ~1621
    <ihv:PageState>Receiving</ihv:PageState> ~1622
   </ihv:Progress>
  </ihv:PrintProgressDetails>
 </wsdst:ElementData>
</wsdst:GetPrinterElementsResponse>
```

FIG.16C

```
<wsdst:GetPrinterElementsRequest>
 <wsdst:RequestedElements>
  <wsdst:Name>ihv:PrintProgressDetails</wsdst:Name> ~1631
  <wsdst:Requirements param="Id">44444444</wsdst:Requirements> ~1632
  <wsdst:Requirements param="Listener">Requester Only</wsdst:Requirements>
  <wsdst:Requirements param="period">Printing</wsdst:Requirements>
  <wsdst:Requirements param="delay">3000</wsdst:Requirements> ~1633
 </wsdst:RequestedElements>
</wsdst:GetPrinterElementsRequest>
```

FIG.19A

| PRIVATE ELEMENT MANAGEMENT TABLE | | | | |
|---|---|---|---|---|
| ELEMENT | LISTENER | PERIOD | APPLICATION ID | |
| InkErrorDetails | INFORMATION PROCESSING APPARATUS xxx | 60000 | 11111111 | ~1901 |
| | | 500 | 22222222 | ~1902 |
| PrintProgressDetails | INFORMATION PROCESSING APPARATUS xxx | Printing | 33333333 | ~1903 |
| | INFORMATION PROCESSING APPARATUS yyy | Printing | 44444444 | ~1904 |

FIG.19B

| PRIVATE ELEMENT MANAGEMENT TABLE | | | | | |
|---|---|---|---|---|---|
| ELEMENT | LISTENER | PERIOD | APPLICATION ID | AGGREGATION | |
| PrintProgressDetails | INFORMATION PROCESSING APPARATUS yyy | Printing | 44444444 | 3000 | ~1911 |

SYSTEM, A DEVICE, AND A METHOD FOR NOTIFYING AN INFORMATION PROCESSING APPARATUS OF AT LEAST ONE OF A PRIVATE EVENT AND A PUBLIC EVENT

BACKGROUND

Field of the Disclosure

Aspects of the present invention generally relate to a technique for notifying information processing apparatuses of information.

Description of the Related Art

Conventionally, there is a technique called status notification.

Japanese Patent Application Laid-Open No. 7-137358 discusses a technique in which a printing apparatus transmits status information as event information to a host computer when a status in the printing apparatus changes.

Assume an environment where an image forming apparatus can notify a plurality of information processing apparatuses of information. Suppose also that when the plurality of information processing apparatuses is notified of specific information, the load of the notified information processing apparatuses processing the specific information increases.

Japanese Patent Application Laid-Open No. 7-137358 does not discuss that the printing apparatus notifies a plurality of host computers of the status. The technique discussed in Japanese Patent Application Laid-Open No. 7-137358 may be unable to notify a plurality of host computers of the status in the first place.

SUMMARY

Aspects of the present invention relate to a device which can notify a plurality of information processing apparatuses of information. When the device notifies a plurality of information processing apparatuses including a specific information processing apparatus of information, the device can notify the specific information processing apparatus of specific information without notifying the information processing apparatus(es) other than the specific information processing apparatus of the specific information.

According to an aspect of the present invention, a device includes a registration unit configured to accept requests from a first information processing apparatus and a second information processing apparatus that the first information processing apparatus and the second information processing apparatus be registered for notification of first information about the device, an acceptance unit configured to accept a request from the first information processing apparatus that the first information processing apparatus be registered for notification of second information about the device, and a notification unit configured to, if a state of the device changes after the registration unit accepts the requests from the first information processing apparatus and the second information processing apparatus, notify the first information processing apparatus, from which the acceptance unit has accepted the request, of the first information and the second information, and notify the second information processing apparatus of the first information without the second information.

Further features of the present invention will become apparent from the following description of exemplary embodiments with reference to the attached drawings.

BRIEF DESCRIPTION OF THE DRAWINGS

FIGS. 6A, 6B, 6C, and 6D are diagrams illustrating contents of private element notification start and end requests, and a response to a private element notification start request.

FIGS. 8A and 8B are diagrams illustrating a private element management table.

FIGS. 10A, 10B, 10C, and 10D are diagrams illustrating contents of event data for the printing apparatus to notify.

FIG. 11 is a diagram illustrating contents of a private element notification start request.

FIGS. 14A and 14B are diagrams illustrating a private element management table.

FIGS. 16A, 16B, and 16C are diagrams illustrating contents of private element notification start requests and a response to a private element notification start request.

FIGS. 19A and 19B are diagrams illustrating a private element management table.

DESCRIPTION OF THE EMBODIMENTS

Various exemplary embodiments, features, and aspects of the invention will be described in detail below with reference to the drawings. It should be noted that the following exemplary embodiments are not intended to limit the present invention set forth in the claims. All combinations of the features described in the exemplary embodiments are not necessarily indispensable for a solution of an exemplary embodiment of the present invention.

Initially, an example of problems assumed in the present specification will be described.

Suppose that a plurality of information processing apparatuses each includes an application or applications. A device notifies a status listener in an information processing apparatus of a status (status A) among a plurality of statuses (status A and status B). Suppose also that a plurality of applications has been obtaining the status A. In such a case, if an application in one of the plurality of information processing apparatuses requests notification of the status B as a necessary status from the device, the status A needed by the other applications may fail to be notified. Those other applications may lack necessary information and cause a failure in operation and/or display.

In a network environment, a plurality of information processing apparatuses may exist on the network. If there is a plurality of information processing apparatuses requesting an event notification, the device needs to notify all the information processing apparatuses of status information. The processing load of the event notification on the device is extremely high.

An exemplary embodiment of the present invention relates to providing a notification request unit of event information with which a plurality of applications in the information processing apparatuses can operate normally, and reducing the load of the event notification on the device in a network environment.

A first exemplary embodiment will be described assuming that the device is a printing apparatus and the information processing apparatuses are personal computers. The device may be an image forming apparatus such as a scanner and a facsimile (FAX).

Figure 2:
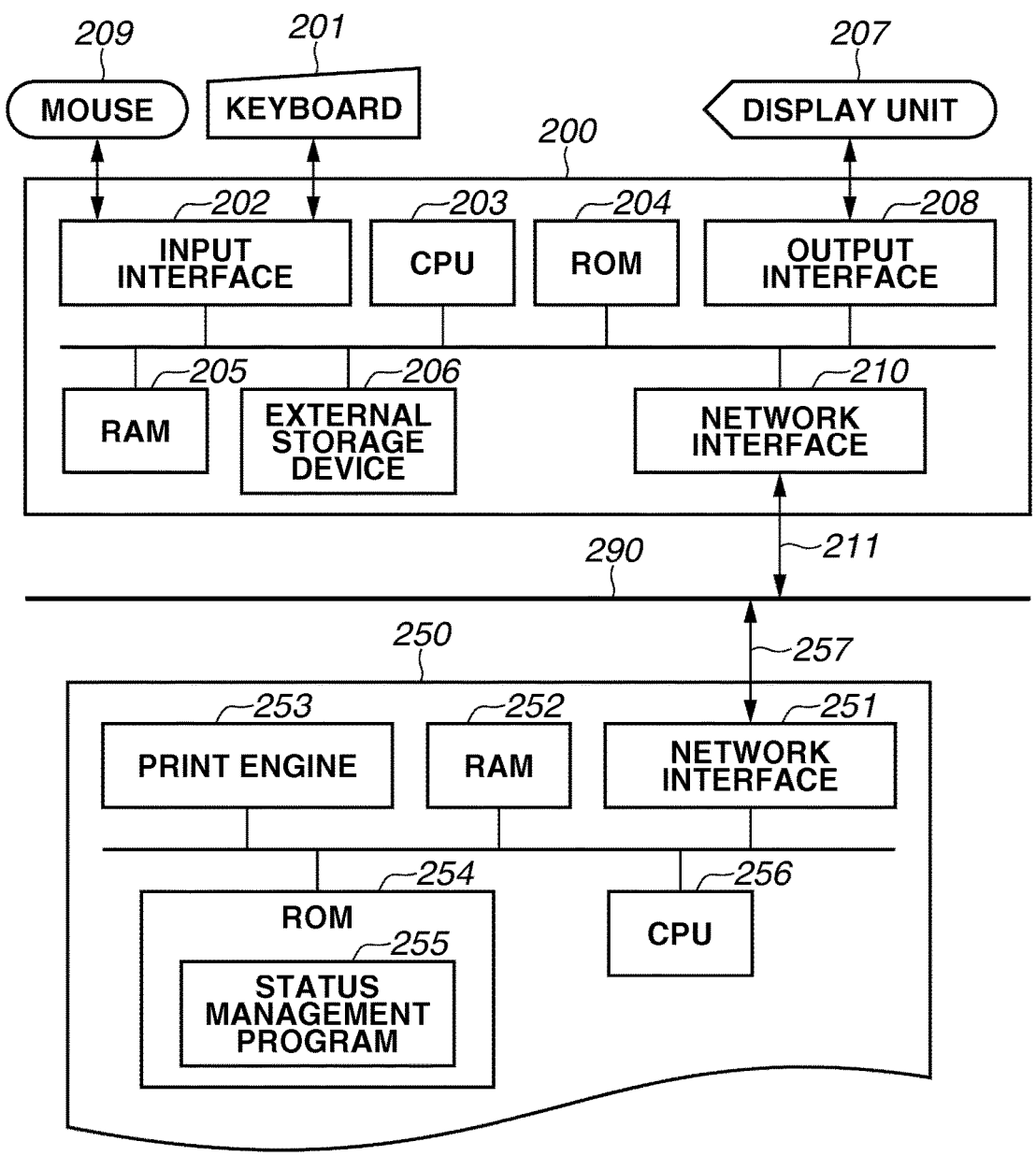
FIG. 2 is a block diagram of a printing system.

Referring to FIG. 2, a printing system including a printing apparatus 250 and a personal computer 200 connected via a network 290 will be described.

A plurality of printing apparatuses and/or personal computers may be connected to the network 290.

The personal computer 200 includes an input interface 202, a central processing unit (CPU) 203, a read-only memory (ROM) 204, a random access memory (RAM) 205, an external storage device 206, an output interface 208, a display unit 207, a keyboard 201, a mouse 209, and a network interface 210. The network interface 201 is connected to the network 290 via a network cable 211. The ROM 204 contains an initialization program. The external storage device 206 stores application programs, an operating system (OS), a printer driver, and various types of data. Various programs stored in the external storage device 206 use the RAM 205 as a work memory.

The CPU 203 performs processing based on the programs stored in the external storage device 206, whereby a software configuration of the personal computer 200 illustrated in FIG. 3 and processing of the steps of flowcharts to be described below are implemented.

The printing apparatus 250 includes a network interface 251, a RAM 252, a print engine 253, a ROM 254, and a CPU 256. The network interface 251 is connected to the network 290 via a network cable 257. The RAM 252 is used as a main memory and a work memory for the CPU 256. The RAM 252 serves as a reception buffer for temporarily storing received print jobs, and stores various types of data. The print engine 253 performs printing based on the data stored in the RAM 252. The ROM 254 contains various control programs including a status management program 255, and data to be used by the control programs. According to such control programs, the CPU 256 controls the components of the printing apparatus 250. The status management program 255 is a program that monitors a state of the printing apparatus 250 based on information about not-illustrated various sensors included in the printing apparatus 250, and generates and stores status information in the RAM 252.

The CPU 256 performs processing based on the programs stored in the ROM 254, whereby processing of the steps of flowcharts to be described below is implemented.

The foregoing distribution of processing between the personal computer 200 and the printing apparatus 250 is an example. The mode of distribution is not limited thereto, and other modes may be employed.

Figure 3:
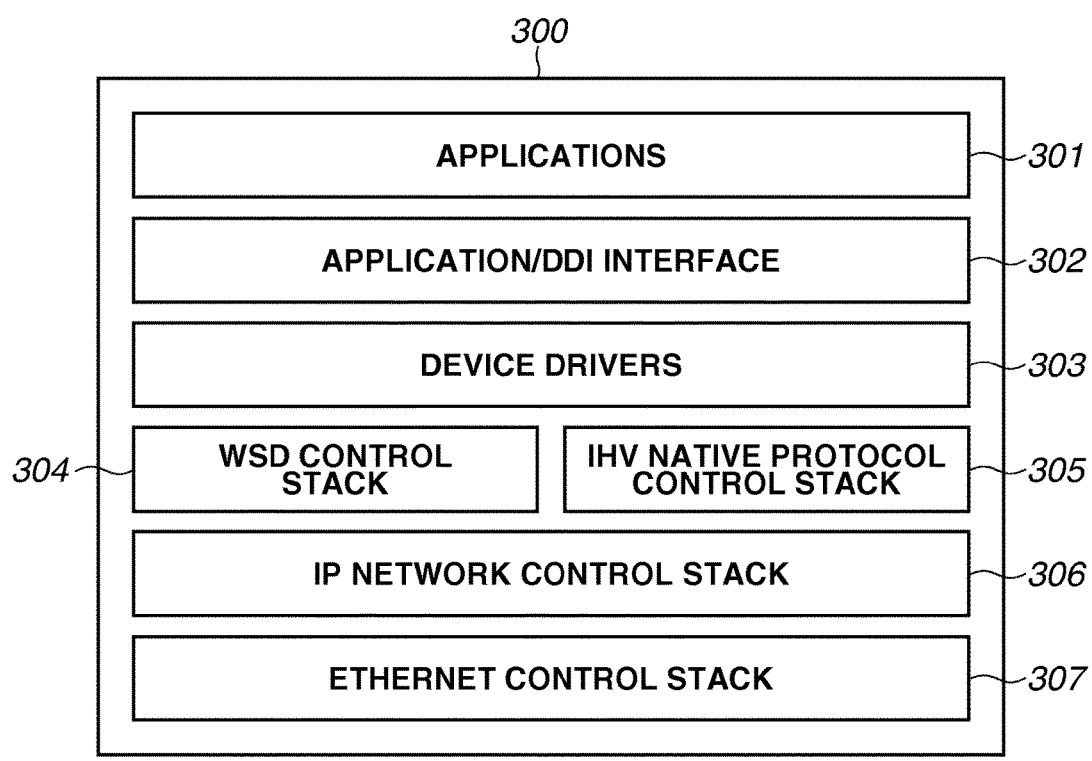
FIG. 3 is a software configuration diagram of a personal computer.

FIG. 3 is a diagram illustrating a software configuration of the personal computer 200. In FIG. 3, an Ethernet control stack 307 is intended for Ethernet control. An Internet protocol (IP) network control stack 306 controls an IP network. A WSD control stack 304 controls WSD. An independent hardware vendor (IHV) native protocol control stack 305 controls IHV's own protocols. Device drivers 303 include standard drivers bundled with the OS by default and IHV-made drivers provided by the IHV. The device drivers 303 include the printer driver for controlling the printing apparatus 250. An application/device driver interface (DDI) interface 302 includes application programming interfaces (APIs) and DDIs. Applications 301 include a remaining ink level display application and a print status monitoring application.

FIGS. 4A, 4B, 4C, and 4D illustrate a screen of the remaining ink level display application according to the present exemplary embodiment.

Figure 4A:
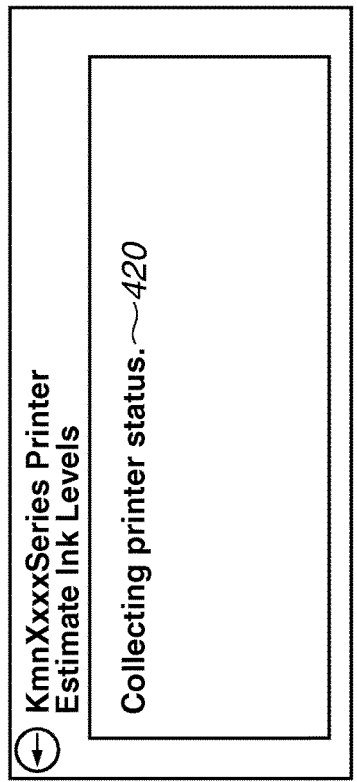
FIGS. 4A, 4B, 4C, and 4D are diagrams illustrating a screen of a remaining ink level display application.

FIG. 4A illustrates the remaining ink level display application (hereinafter, referred to as ink display application) 400. The printing apparatus 250 uses inks as consumables. The ink display application 400 has a function of obtaining remaining level information about the inks from the printing apparatus 250 and schematically displaying the remaining level information. The ink display application 400 displays a name 401 of the printing apparatus 250 to display remaining ink levels thereof. A remaining ink level display section 402 displays names 403 of the inks, and schematically displays the remaining levels 404 of the inks. An icon display section 405 is intended to call a user's attention to an ink state. If the user selects an end button 406, the ink display application 400 ends processing.

Figure 5:
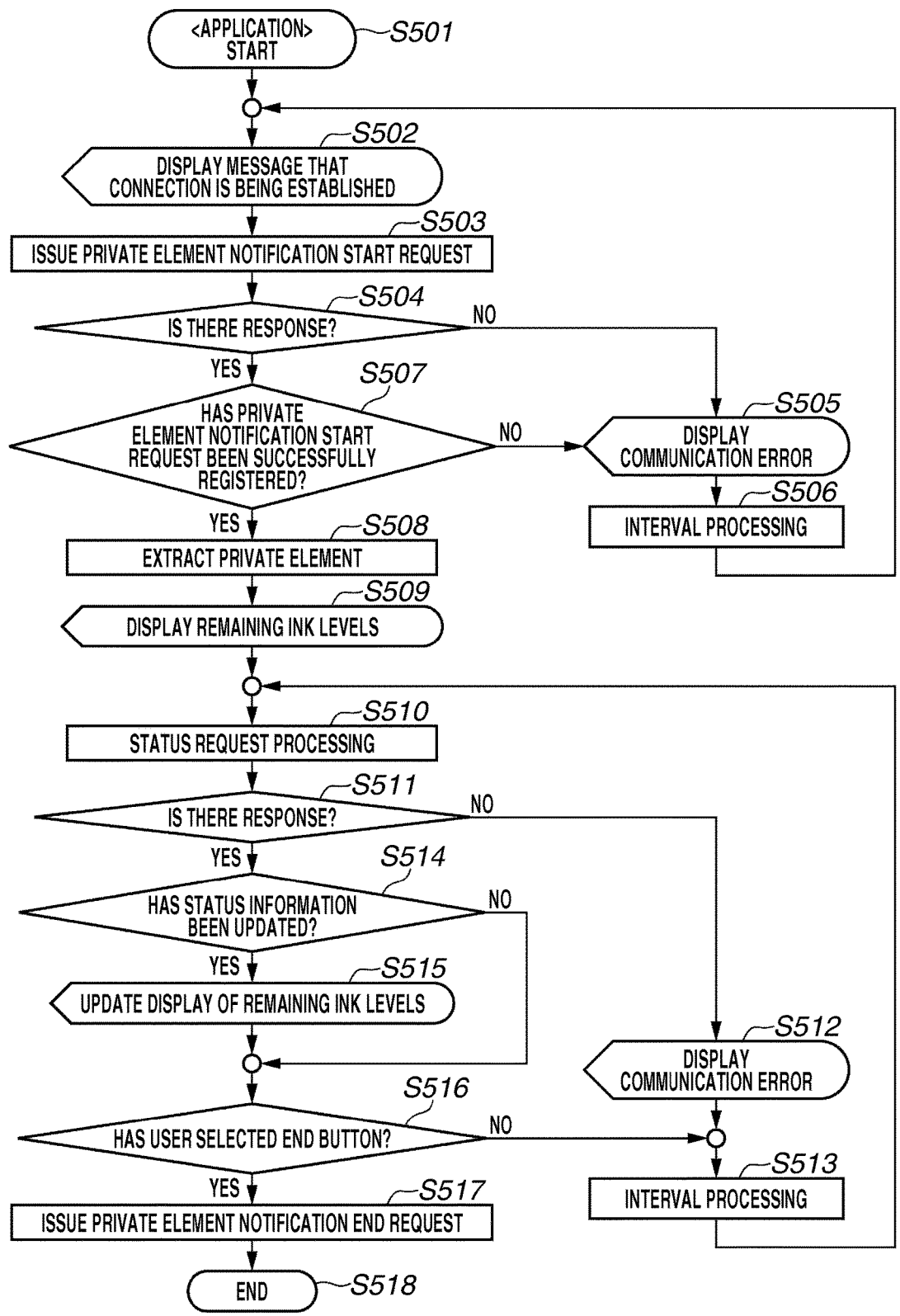
FIG. 5 is a flowchart illustrating processing of the remaining ink level display application.

FIG. 5 is a flowchart illustrating the processing of the ink display application 400.

Figure 4B:
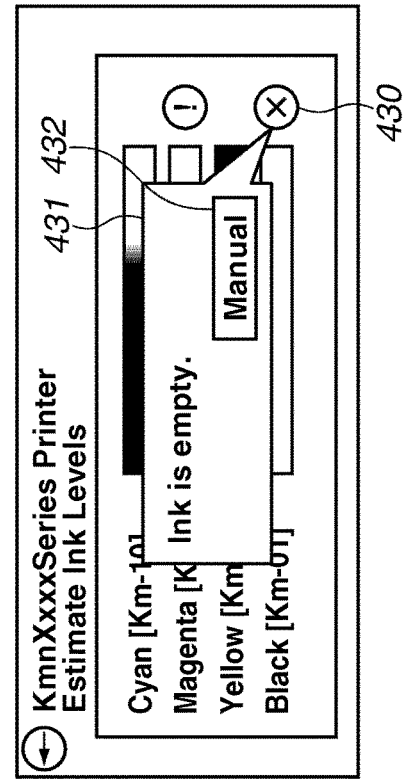

In step S501, the ink display application 400 receives a start instruction given by the user's operation on the personal computer 200 or by the OS, and starts the processing. In step S502, the ink display application 400 displays a message 420 that a connection is being established as an initial display state as illustrated in FIG. 4B. In step S503, the ink display application 400 issues a private element notification start request to the printing apparatus 250.

If event data to be described below is status information, its private element includes detailed status information to be described below. As employed herein, a private element of status information will be referred to as private status information. If the event data to be described below is status information, its public element includes simple generalized status information. As employed herein, a public element of status information will be referred to as public status information.

By issuing the private element notification start request in step S503, the personal computer 200 can obtain both private status information and public status information from the printing apparatus 250. Specifically, in step S503, the personal computer 200 issues the private element notification start request by notifying the printing apparatus 250 of GetPrinterElementsRequest defined by Microsoft WSD Print Service.

<Status Information and Event Data>

A relationship between status information, event data, public, and private will be described.

As employed herein, event data including a private element will be referred to as private event data. Event data including a public element will be referred to as public event data.

Public status information and private status information are examples of information included in event data. Aside from the status information, event data may include configuration information about the printing apparatus 250 and capability information about the printing apparatus 250.

<Private Element Notification Start and End Requests and Response>

Contents of a private element notification start request issued by using GetPrinterElementsRequest will be described with reference to FIG. 6A. GetPrinterElementsRequest is written in Extensible Markup Language (XML). GetPrinterElementsRequest includes a GetPrinterElementsRequest start element 601. The prefix "wsdst" is an abbreviation for a standard (public) WSD Print Service name space. The GetPrinterElementsRequest start element 601 is followed by a RequestedElements start element 602. A Name element 603 contains data "ihv:InkErrorDetails." If the printing apparatus 250 is notified of the data "ihv:InkErrorDetails," the printing apparatus 250 performs processing for sending back information "ihv:InkErrorDetails" to the requester (to be described below).

The prefix "ihv" is an abbreviation for a private element name space. The prefix "ihv" means that the element is the vendor's own (private) one customized by the IHV.

A Requirements element 604 accompanied with attribute information param="Id" contains data "11111111." The data "11111111" is an identifier of an application running in the personal computer 200. The identifier is not redundant at least within the personal computer 200. An identifier that is unique even outside the personal computer 200, like a Globally Unique Identifier (GUID), may be used. If the printing apparatus 250 is notified of the data "11111111" by the Requirements element 604 accompanied with the attribute information "Id," the printing apparatus 250 uses the data "11111111" as information for identifying the application that has requested the notification of the information "ihv:InkErrorDetails" (to be described below). A Requirements element 605 accompanied with attribute information param="Listener" contains data "Requester Only." If the printing apparatus 250 is notified of the data "Requester Only" by the Requirements element 605 accompanied with the attribute "Listener," the printing apparatus 250 stores that only the requester personal computer 200 of GetPrinterElementsRequest is notified of the information "ihv:InkErrorDetails" by an event notification (to be described below). A Requirements element 606 accompanied with attribute information param="period" contains data "Begin." If the printing apparatus 250 is notified of the data "Begin" by the Requirements element 606 accompanied with the attribute "period," the printing apparatus 250 stores that the requester personal computer 200 continues to be notified of the information "ihv:InkErrorDetails" by event notifications until an end instruction is given (to be described below).

In step S503, the ink display application 400 requests the printing apparatus 250 by the private element notification start request to subsequently continue notifying ihv:InkErrorDetails by event notifications. In step S504, the ink display application 400 determines whether there is a response. In step S504, if the ink display application 400 fails to obtain a response from the printing apparatus 250 (NO in step S504), then in step S505, the ink display application 400 displays a communication error. In FIG. 4B, the ink display application 400 displays a message 420 that the communication with the printing apparatus 250 has failed. After the display of the communication error in step S505, then in step S506, the ink display application 400 performs interval processing. The interval processing of step S506 is wait processing for waiting an arbitrary time before proceeding to next processing. After the end of the interval processing in step S506, then in step S502, the ink display application 400 displays the message 420 that a communication is being established again. In the present exemplary embodiment, the wait time of the interval processing may be an arbitrarily set time or a fixed time. The wait time may be dynamically generated according to a network communication status.

In step S504, if there is a response (YES in step S504), then in step S507, the ink display application 400 determines whether the private element notification start request has been successfully registered in the printing apparatus 250. If the private element notification start request has failed to be registered (NO in step S507), then in step S505, the ink display application 400 displays a communication error. If the private element notification start request has been successfully registered (YES in step S507), then in step S508, the ink display application 400 extracts a private element from response information. In step S509, the ink display application 400 displays remaining ink levels according to the private status information obtained from the printing apparatus 250, extracted in step S508, and public status information (to be described below). The response information refers to GetPrinterElementsResponse, which is response information with respect to GetPrinterElementsRequest.

Contents of the GetPrinterElementsResponse, which is the response information with respect to the private element notification start request, will be described with reference to FIG. 6B. GetPrinterElementsResponse is written in XML. GetPrinterElementsResponse includes a GetPrinterElementsResponse start element 620. An ElementData start element 621 is accompanied with a Name attribute and a Valid attribute. The Name attribute has an attribute value indicating that the following XML information is response information with respect to "ihv:InkErrorDetails." The Valid attribute has an attribute value "true" which indicates that this response information is valid. The ElementData start element 621 is followed by an InkErrorDetails start element 622. An Entry start element 623 is accompanied with attribute information name="Black." This attribute value "Black" indicates that the following XML information is information about black ink. An InkState element 624 contains data "Out." The data "Out" of the InkState element 624 indicates that ink may have run out. A Message element 625 contains data "Ink has run out." wrapped by CDATA tags. An Icon element 626 contains data "Cross." A SupportCode element 627 contains data "E2000." In step S508, the ink display application 400 extracts the private element "ihv:InkErrorDetails" described in FIG. 6B to obtain status information. In step S509, the ink display application 400 provides the ink display described in FIG. 4A.

FIG. 6C illustrates GetPrinterElementsRequest, which is a private element notification end request. An application identifier "11111111" is set in a Requirements element 610 accompanied with attribute information param="Id." A Requirements element 611 with param="period" contains data "End." Receiving the information described by the Requirements elements 610 and 611, the printing apparatus 250 unregisters the private element notification registration (to be described below).

FIG. 6D illustrates GetPrinterElementsRequest for requesting notification of a private element only once. A Requirements element 630 accompanied with attribute information param="period" contains data "Once." Receiving the request of FIG. 6D, the printing apparatus 250 notifies the personal computer 200 of the private element only once after the reception of the request.

<Ink Display Application>

Figure 4C:
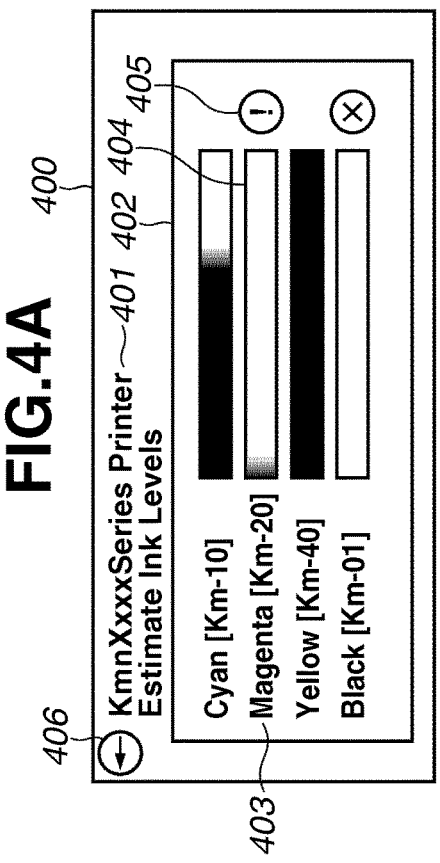

FIG. 4C illustrates a state of display when the user has operated the ink display application 400 illustrated in FIG. 4A. An icon display 410 in FIG. 4C is displayed based on the data "Cross" of the Icon element 626. If the user selects the icon display 410, a popup display 411 appears to convey the message to the user that "Ink has run out." This message is displayed based on the data "Ink has run out." of the Message element 625. If the user selects an operation manual activation button 412, the ink display application 400 displays an electronic operation manual (not illustrated). Here, the operation manual is opened with a page describing the ink state "out" as an initial screen. The operation of opening the page describing the ink state "out" is implemented by passing the data "E2000" of the SupportCode element 627 to the electronic operation manual as a parameter. The various types of data described above are detailed information (private element), which is needed only by applications such as described in FIGS. 4A to 4D. Information about a private element is not needed by personal computers 200 on which no such applications as described in FIGS. 4A to 4D run. The printing apparatus 250 desirably does not notify personal computers 200 not needing a private element of the private element.

After the display of the remaining ink levels in step S509, then in step S510, the ink display application 400 performs status request processing. The status request processing of step S510 is processing for obtaining a status from a listener module in the personal computer 200 that receives the event data notified by the printing apparatus 250. The present exemplary embodiment is described assuming that the listener module is assumed a WSD port monitor (to be described below). In step S511, the ink display application 400 determines whether there is a response to the status request processing of step S510 from the printing apparatus 250. If there is determined to be no response (NO in step S511), then in step S512, the ink display application 400 displays a communication error. In step S513, the ink display application 400 performs interval processing. The ink display application 400 returns to the status request processing of step S510.

In step S511, if there is determined to be a response (YES in step S511), then in step S514, the ink display application 400 analyzes status information about the printing apparatus 250, and determines whether the status information has been updated. If the status information has been updated (YES in step S514), then in step S515, the ink display application 400 updates the display of the remaining ink levels. In step S516, the ink display application 400 makes an application end determination. In step S514, if the status information is determined not to have been updated (NO in step S514), then in step S516, the ink display application 400 makes an application end determination without updating the display of the remaining ink levels. For example, the ink display application 400 makes the application end determination of step S516 by performing processing for determining whether the user has selected the end button 406 of the ink display application 400. In step S516, if the ink display application 400 determines that the user has not given an application end instruction (NO in step S516), the ink display application 400 returns to the status request processing of step S510 via the interval processing of step S513.

In step S516, if the ink display application 400 determines that the user has given an application end instruction (YES in step S516), then in step S517, the ink display application 400 issue the private element notification end request of FIG. 6C to the printing apparatus 250. In step S518, the ink display application 400 ends the processing.

<Personal Computer Request Acceptance Processing>

Figure 7A:
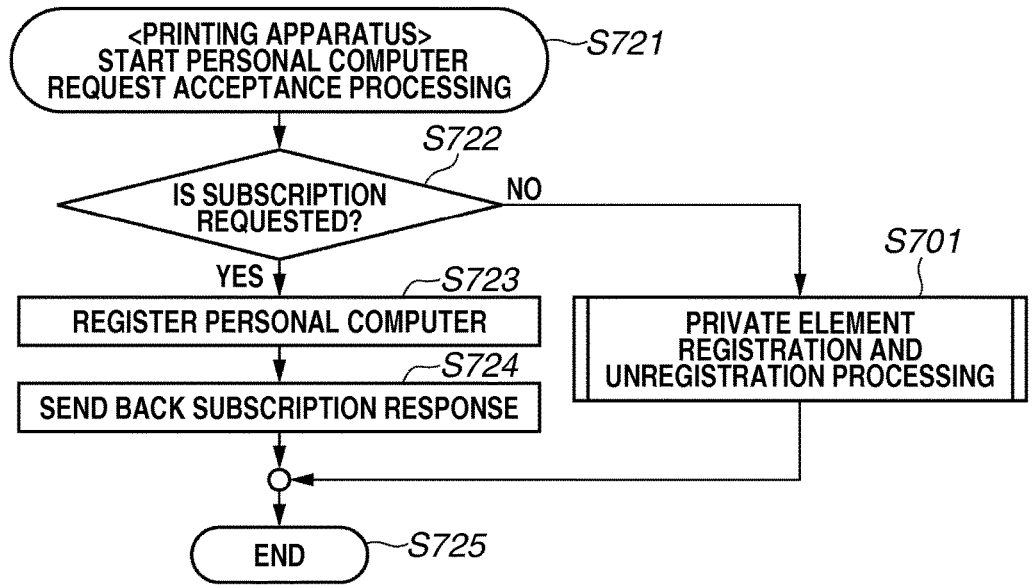
FIGS. 7A and 7B are flowcharts illustrating processing for a printing apparatus to perform when accepting a request from a personal computer.

FIG. 7A is a flowchart illustrating processing for the printing apparatus 250 to perform when accepting a request from a personal computer 200. An example of the request is a subscription request.

If the OS of the personal computer 200 confirms that the printing apparatus 250 to be associated with a WSD printer driver installed in the personal computer 200 exists on the network, the OS makes a subscription request. Subscription refers to event notification registration processing to be performed between the personal computer 200 and the printing apparatus 250. At the time of subscription, the OS of the personal computer 200 can specify which event(s) for the printing apparatus 250 to notify the personal computer 200 of. The following description assumes that at the time of subscription, the OS designates all events the printing apparatus 250 can notify the personal computer 200 of.

In step S721, the printing apparatus 250 starts personal computer request acceptance processing. In step S722, the printing apparatus 250 determines whether subscription is requested by the personal computer 200. If subscription is determined to be requested (YES in step S722), the printing apparatus 250 proceeds to step S723. If subscription is determined not to be requested (NO in step S722), the printing apparatus 250 proceeds to step S701.

In step S723, the printing apparatus 250 registers the personal computer 200 as a listener of the events.

In step S724, the printing apparatus 250 sends back a subscription response to the personal computer 200.

In step S725, the printing apparatus 250 ends the personal computer request acceptance processing.

The personal computer 200 unsubscribes on timing such as when the OS ends and when the printing apparatus 250 disappears from the network (including when the printing apparatus 250 is powered off). Unsubscription refers to processing for unregistering an event notification registration(s).

Some applications of the personal computer 200 may issue a private element notification start request (step S503) and/or a private element notification end request (step S517) without subscription. Thus, the printing apparatus 250 may be configured as follows: In step S722, if subscription is determined not to be requested (NO in step S722), then before the processing of step S710, the printing apparatus 250 determines whether the personal computer 200 has subscribed. If the personal computer 200 is determined to have subscribed, the printing apparatus 250 performs the processing of step S710. If the processing for determining whether the personal computer 200 has subscribed is provided and the personal computer 200 is determined not to have subscribed, the printing apparatus 250 ends the personal computer request acceptance processing.

<Management of Private Element Listeners>

Figure 7B:
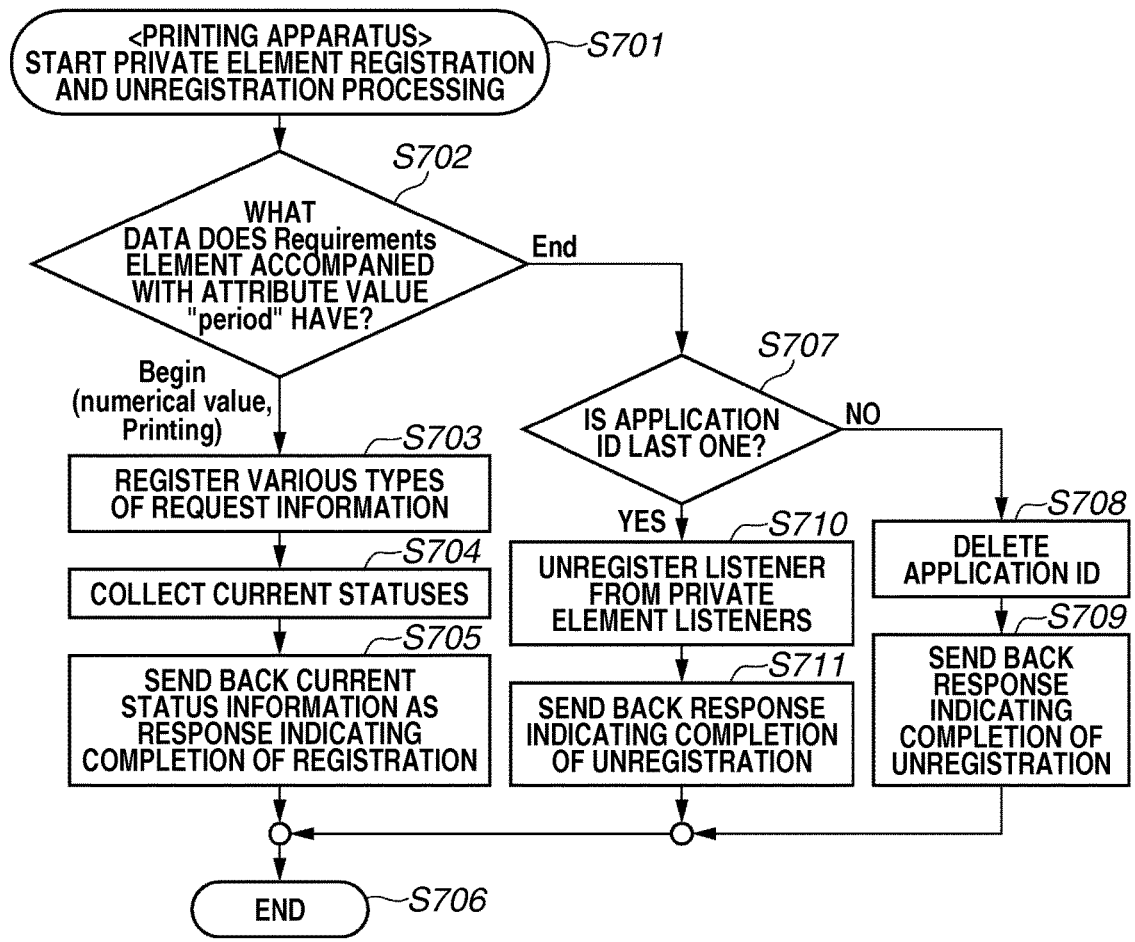

FIG. 7B is a flowchart illustrating private element registration and unregistration processing of the printing apparatus 250. The private element registration and unregistration processing of the printing apparatus 250 will be described with reference to FIG. 7B. The printing apparatus 250 performs the private element registration and unregistration processing in response to a private element notification start request (step S503) and a private element notification end request (step S517) from the ink display application 400.

In step S701, the printing apparatus 250 receives a private element notification request including Requirements elements such as illustrated in FIG. 6A and starts the private element registration and unregistration processing. In step S702, the printing apparatus 250 determines the data of the Requirements element accompanied with the attribute value "period." If the data indicates a registration request such as illustrated in FIG. 6A ("Begin" in step S702), then in step S703, the printing apparatus 250 stores the private element 603 "InkErrorDetails" to be issued as an event. In step S703, the printing apparatus 250 further registers the listener in the personal computer 200 having issued the GetPrinterElementsRequest as a listener of the event including the private element 603 "InkErrorDetails." In step S703, the printing apparatus 250 further stores the requester application ID. In step S704, the printing apparatus 250 collects current statuses. In step S705, the printing apparatus 250 sends back current status information by using GetPrinterElementsResponse (FIG. 6B) as a response indicating completion of registration. In step S706, the printing apparatus 250 ends the private element registration and unregistration processing.

FIGS. 8A and 8B are diagrams schematically illustrating a private element management table managed in the printing apparatus 250. When the printing apparatus 250 receives GetPrinterElementsRequest of FIG. 6A, the printing apparatus 250 stores information as illustrated in FIG. 8A. "InkErrorDetails" is stored as a private element name 801. "INFORMATION PROCESSING APPARATUS xxx" is stored as a listener 802. "Begin" is stored as a period 803, and "11111111" is stored as an application ID 804. In the status of registration of the private element management table illustrated in FIG. 8A, the printing apparatus 250 notifies the listener 802 "INFORMATION PROCESSING APPARATUS xxx" of the element 801 "InkErrorDetails" if the information subsequent to the element 801 "InkErrorDetails" has changed.

Referring back to FIG. 7B, in step S702, if the data indicates an unregistration request such as illustrated in FIG. 6C ("End" in step S702), then in step S707, the printing apparatus 250 determines whether the application ID of the private element listener to be unregistered is the last one in the listener personal computer 200. FIG. 8B illustrates the private element management table in which two application IDs are stored for the same listener "INFORMATION PROCESSING APPARATUS xxx." Here, "11111111" and "22222222" are stored as application IDs 810. In the illustrated state, two different applications in the personal computer 200 each have made a notification registration request for the private element "InkErrorDetails." In step S707, if a plurality of application IDs is registered for a specific listener of a private element as illustrated in FIG. 8B (NO in step S707), the printing apparatus 250 deletes the application ID to be unregistered from the private element management table. Deleting the application ID 810 "22222222" from the private element management table illustrated in FIG. 8B results in the private element management table illustrated in FIG. 8. In step S709, the printing apparatus 250 sends back a response indicating completion of unregistration. In step S706, the printing apparatus 250 ends the private element registration and unregistration processing. The notification request for the application ID 804 "11111111" has not been unregistered yet. If the information subsequent to the element 801 "InkErrorDetails" changes subsequently, the printing apparatus 250 notifies the listener 802 "INFORMATION PROCESSING APPARATUS xxx" of the element 801 "InkErrorDetails."

In step S707, if there is only one application ID registered for a certain listener of a private element (YES in step S707), then in step S710, the printing apparatus 250 unregisters the listener 802 from private element listeners. If the information subsequent to the element 801 "InkErrorDetails" changes subsequently, the printing apparatus 250 will not notify the listener 802 "INFORMATION PROCESSING APPARATUS xxx" of the element 801 "InkErrorDetails." In step S711, the printing apparatus 250 sends back a response indicating the completion of unregistration. In step S706, the printing apparatus 250 ends the private element registration and unregistration processing.

Even if all private element notification requests of a personal computer 200 are unregistered, the printing apparatus 250 notifies the personal computer 200 of a public element. A private element unregistration request such as illustrated in FIG. 6A is only intended to request that the addition of a private element to an event be cancelled, not to request that an event notification be unregistered.

<Event Notification Processing of Printing Apparatus>

Figure 21:
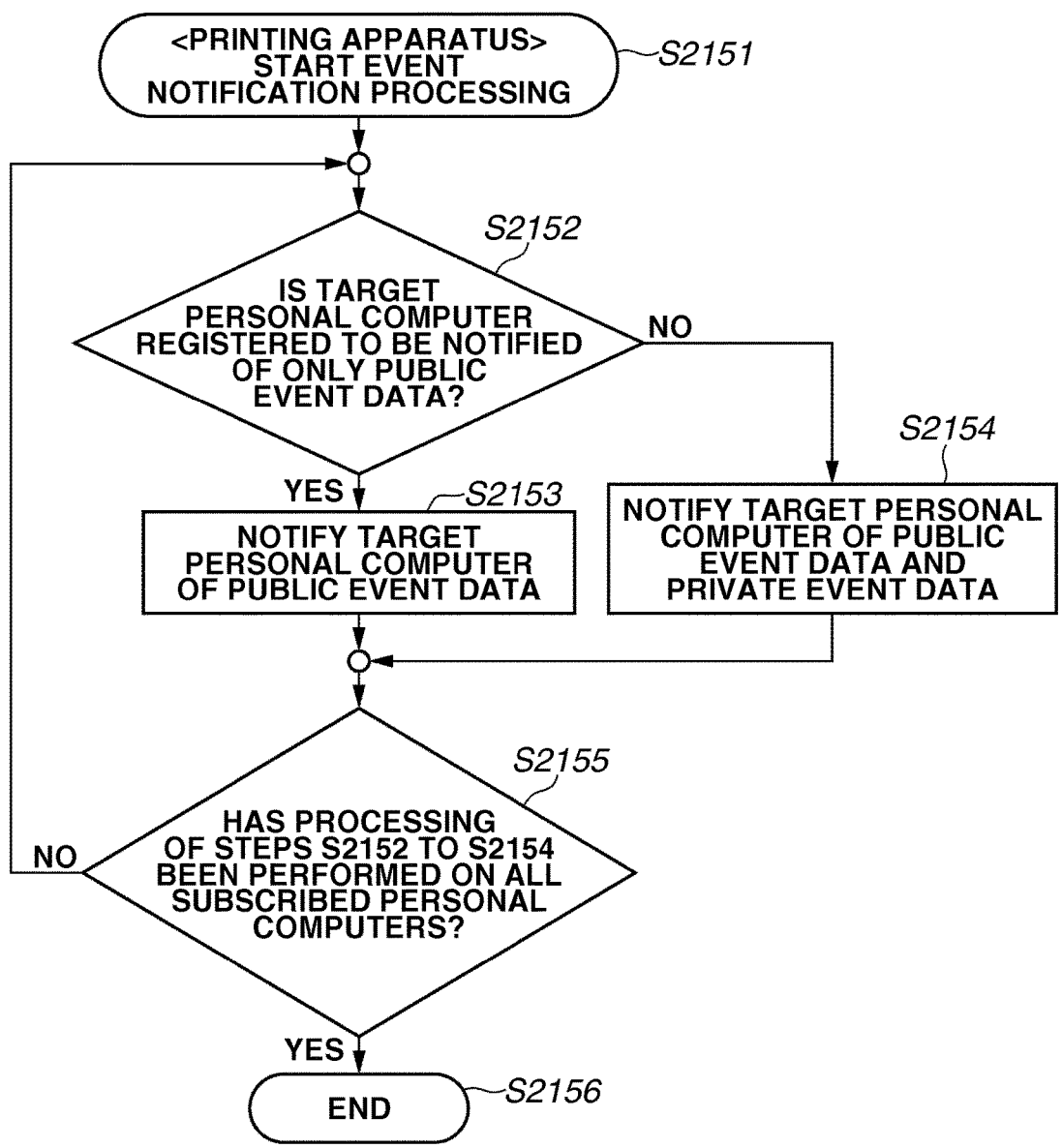
FIG. 21 is a flowchart illustrating event notification processing of a printing apparatus according to a first exemplary embodiment.

FIG. 21 is a flowchart illustrating event notification processing of the printing apparatus 250.

In step S2151, the printing apparatus 250 starts the event notification processing. The printing apparatus 250 performs the processing of steps S2152 to S2154 on each personal computer 200 subscribed to the printing apparatus 250.

In step S2152, the printing apparatus 250 determines whether the target personal computer 200 is registered to be notified of only public event data. Specifically, if the target personal computer 200 is the one on which the processing of step S723 has been performed, the printing apparatus 250 determines that the target personal computer 200 is registered to be notified of public event data. If the target personal computer 200 is the one that has been unregistered from the notification of private event data, the printing apparatus 250 also determines that the target personal computer 200 is registered to be notified of public event data. On the other hand, if the target personal computer 200 is the one on which the processing of step S703 has been performed in addition to the processing of step S723 (i.e., a private element listener described above), the printing apparatus 250 determines that the target personal computer 200 is registered to be notified of public event data and private event data. If the target personal computer 200 is registered to be notified of only public event data (YES in step S2152), the printing apparatus 250 proceeds to step S2153. If the target personal computer 200 is not registered to be notified of only public event data (NO in step S2152), the printing apparatus 250 proceeds to step S2154.

In step S2153, the printing apparatus 250 notifies the target personal computer 200 of public event data, and proceeds to step S2155. In step S2153, unlike step S2154, the printing apparatus 250 does not notify the target personal computer 200 of private event data. As a specific example, the printing apparatus 250 may notify the target personal computer 200 of public event data illustrated in FIG. 10A to be described below.

In step S2154, the printing apparatus 250 notifies the target personal computer of the public event data and private event data, and proceeds to step S2155. As a specific example, the printing apparatus 250 may notify the target personal computer 200 of public event data and private event data illustrated in FIGS. 10A and 10B or FIG. 10C.

In step S2155, the printing apparatus 250 determines whether the processing of steps S2152 to S2154 has been performed on all the subscribed personal computers 200. If not (NO in step S2155), the printing apparatus 250 performs the processing of step S2152 and subsequent steps on the next target personal computer 200. If the processing has been performed on all the subscribed personal computers 200 (YES in step S2155), then in step S2156, the printing apparatus 250 ends the event notification processing.

The processing illustrated in FIG. 21 will be specifically described by using two personal computers A and B as an example. Suppose that the personal computer A is registered to be notified of public event data and private event data, and the personal computer B is registered to be notified of public event data.

In step S2152, if the target personal computer 200 is the personal computer A (NO in step S2152), the printing apparatus 250 performs the processing of step S2154. If the target personal computer 200 is the personal computer B (YES in step S2152), the printing apparatus 250 performs the processing of step S2153.

<Element Cache Processing and Status Response Processing>

Figure 9:
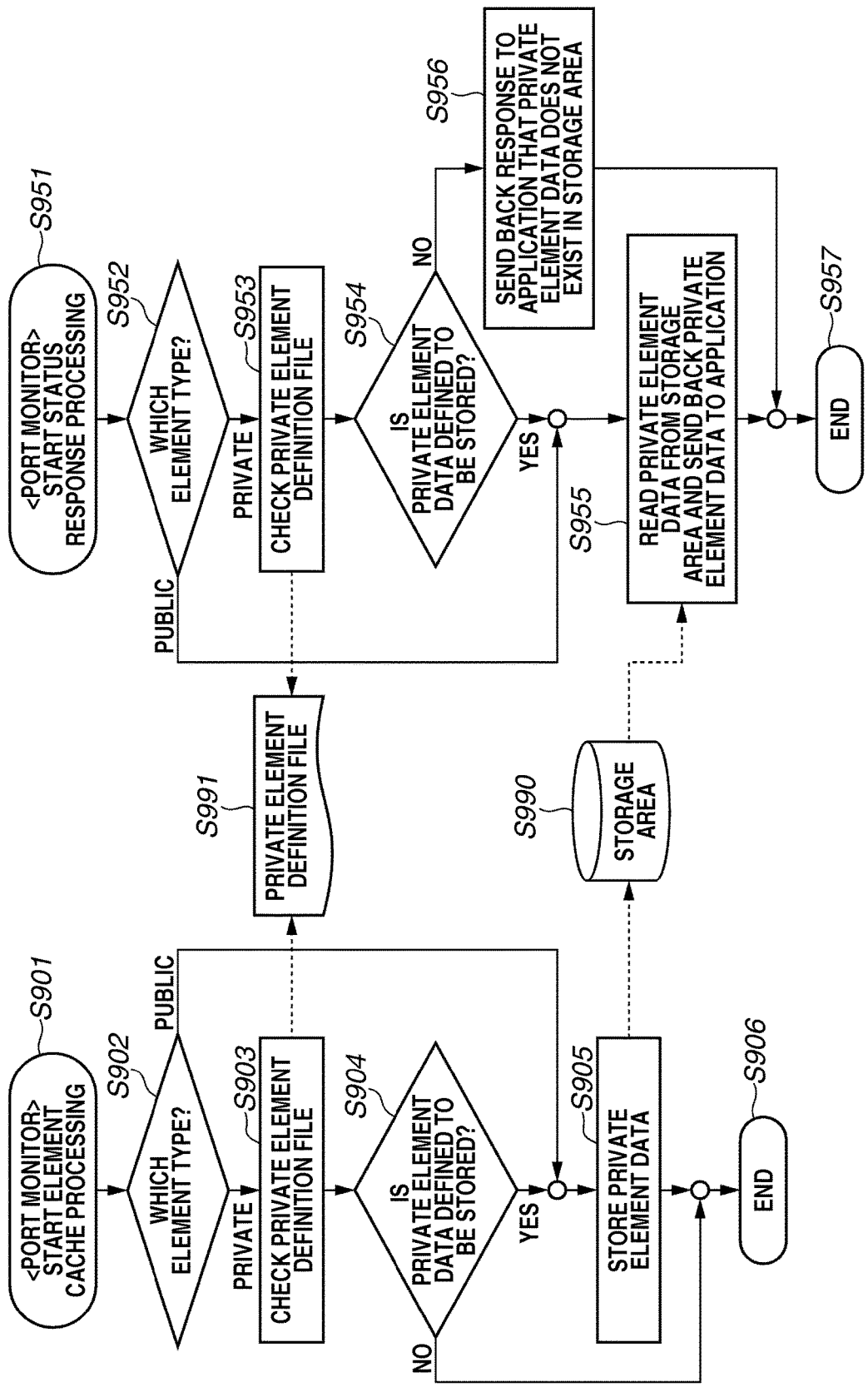
FIG. 9 is a flowchart illustrating element cache processing and status response processing of a Web Services on Devices (WSD) port monitor.

FIG. 9 is a flowchart illustrating element cache processing and status response processing of the WSD port monitor. The WSD port monitor is a listener module in the personal computer 200. Processing in which the WSD port monitor receives and stores event data notified by the printing apparatus 250 and provides status information in response to a status request (step S510) from the ink display application 400 will be described below.

The element cache processing of the WSD port monitor is initially described. In step S901, the WSD port monitor starts the element cache processing when receiving an event notification from the printing apparatus 250. In step S901, starting the element cache processing, the WSD port monitor refers to contents of the received event data. In step S902, the WSD port monitor makes an element type determination to determine whether the element included in the event data is a private element or public element. In the element type determination processing of step S902, if there is determined to be a private element (PRIVATE in step S902), then in step S903, the WSD port monitor refers to a private element definition file S991. The private element definition file S991 is one of the v4 printer driver configuration files introduced in Windows (registered trademark) 8, an OS manufactured by Microsoft Corporation, and is referred to as a "bidirectional (bidi) extension file." The bidi extension file describes how to handle private elements of events received from the printing apparatus 250. In an exemplary embodiment of the present invention, the bidi extension file is referred to as a private element definition file S991. In step S903, the WSD port monitor checks the private element definition file S991. In step S904, the WSD performs a definition determination to determine whether to store the private element included in the received event data as information responding to an application. If the private element data is determined to be stored (YES in step S904), then in step S905, the WSD port monitor stores the private element data in a storage area S990. In step S906, the WSD port monitor ends the element cache processing. In step S904, if the private element data is determined not to be stored, then in step S906, the WSD port monitor ends the element cache processing without storing the private element data. In step S902, if the information is determined to be a public element (PUBLIC in step S902), then in step S905, the WSD port monitor stores the public element data in the storage area S990. In step S906, the WSD port monitor ends the element cache processing.

Next, the status response processing of the WSD port monitor will be described. In step S951, the WSD port monitor starts the status response processing in response to a status response request from an application 301. The present exemplary embodiment deals with a case where the ink display application 400 makes the status response request. After the start of the status response processing in step S951, then in step S952, the WSD port monitor determines the element type of the response-requested element data. In step S952, if the response-requested element data is determined to be a private element (PRIVATE in step S952), then in step S953, the WSD port monitor checks the private element definition file S991. In step S954, the WSD port monitor performs a definition determination to determine whether the private element data for which the status response request is made is defined to be private element data to be stored. In step S954, if the private element data for which the status response request is made is determined to be defined as private element data to be stored (YES in step S954), then in step S955, the WSD port monitor reads private element data from the storage area S990. In step S955, the WSD port monitor then sends back the read private element data to the ink display application 400. In step S957, the WSD port monitor ends the status response processing. In step S954, if the private element data for which the status response request is made is determined not to be defined as private element data to be stored (NO in step S954), then in step S956, the WSD port monitor sends back a response to the ink display application 400 that the private element data does not exist in the storage area S990. In step S957, the WSD port monitor ends the status response processing. In step S952, if the response-requested element data is determined to be a public element (PUBLIC in step S952), then in step S955, the WSD port monitor reads the public element data from the storage area S990 and sends back the read public element data to the ink display application 400. In step S957, the WSD port monitor ends the status response processing. The present exemplary embodiment has dealt with the configuration where the WSD port monitor serves as a listener module to receive event data from the printing apparatus 250 and supply status information in the event data to an application. However, the IHV's own listener module may be installed as a service in the personal computer 200. In such a case, the IHV's own listener module may receive event data from the printing apparatus 250 and supply status information to an application.

Advantages of the provision of the configuration illustrated in FIG. 9 will be described.

Suppose, for example, that the personal computer 200 receives event data notified by the printing apparatus 250 before the ink display application 400 is activated in an environment without the configuration of FIG. 9. In such a case, the ink display application 400 cannot obtain the event data since the event data is not stored anywhere.

In FIG. 9, the WSD port monitor receives and stores the event data. Applications can thus obtain the event data at timing desired by the applications.

<Public Event Data and Private Event Data>

FIG. 10A illustrates contents of event data for the printing apparatus 250 to notify. The event data includes a PrinterElementsChangeEvent start element 1000. PrinterElementsChangeEvent is an event of the WSD Print Service.

PrinterElementsChangeEvent is one of pieces of event data notified when a state of the printing apparatus 250 changes. The PrinterElementsChangeEvent start element 1000 is followed by a PrinterConfiguration start element 1001. A ConsumableEmpty start element 1002 is accompanied with attribute information Name="Black." The attribute value "Black" indicates that the subsequent XML information is information about black ink. A Color element 1003 contains data "Black." Based on the data "Black," the ink display application 400 displays the color name in the ink name display section illustrated in FIGS. 4A, 4C, and 4D. A Level element 1004 contains data "0." Based on the data "0," the ink display application 400 displays the remaining level schematically indicating the remaining ink level illustrated in FIGS. 4A, 4C, and 4D. A Model element 1005 contains data "Km-01." Based on the data "Km-01," the ink display application 400 displays the ink model number in the ink name display section illustrated in FIGS. 4A, 4C and 4D. The foregoing PrinterConfiguration element 1001 illustrated in FIG. 10A is standard notification information (public element). The printing apparatus 250 notifies all personal computers 200 that have made the WSD subscription to the printing apparatus 250 of such standard notification information.

Contents of event data for the printing apparatus 250 to notify will be described with reference to FIG. 10B. In the present exemplary embodiment, the listener module for receiving this event data is the WSD port monitor. The event data includes a PrinterElementsChangeEvent start element 1010.

The PrinterElementsChangeEvent start element 1010 is followed by an InkErrorDetails start element 1011. Event data including an InkErrorDetails element is notified only if a notification start request is made from the personal computer 200 side by an application or by the OS.

If the state of the InkErrorDetails 622 in the GetPrinterElementsResponse 620 described in FIG. 6B has changed, the printing apparatus 250 issues an event notification to the personal computer 200 by using the PrinterElementsChangeEvent 1010 as illustrated in FIG. 10B.

An Entry start element 1012 is accompanied with attribute information name="Black." The attribute value "Black" indicates that the subsequent XML information is information about black ink.

An InkState element 1013 contains data "Empty." The data "Empty" of the InkState element 1013 indicates that there is no ink left.

A Message element 1014 contains data "Ink is empty." wrapped by CDATA tags.

An Icon element 1015 contains data "Cross."

A SupportCode element 1016 contains data "E3000."

The PrinterConfiguration element 1001 illustrated in FIG. 10A is public information as indicated by the prefix "wsdst." The InkErrorDetails element 1011 illustrated in FIG. 10B is private information as indicated by the prefix "ihv."

If the information subsequent to the PrinterConfiguration element 1001 and the information subsequent to the InkErrorDetails element 1011 have changed at the same time, the printing apparatus 250 issues PrinterElementsChangeEvent including the PrinterConfiguration element 1001 and the InkErrorDetails element 1011 as child elements.

FIG. 10C illustrates an example of information about an event (PrinterElementsChangeEvent) in which the public event data illustrated in FIG. 10A and the private event data illustrated in FIG. 10B are stored.

<Update of Display of Ink Display Application>

Figure 4D:
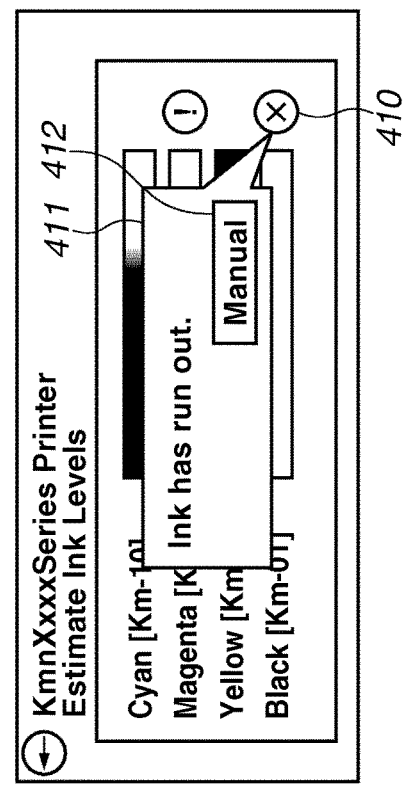

FIG. 4D illustrates a state of display when the display of the ink display application 400 is updated based on the event notification of FIG. 10B. In FIG. 4D, the ink display application 400 displays an icon display 430 based on the data "Cross" of the Icon element 1015, which is not updated. If the user selects the icon display 430, the ink display application 400 displays a popup display 431 to convey a message to the user that "Ink is empty." This message is displayed based on the data of the Message element 1014. If the user selects an operation manual activation button 432, the ink display application 400 opens a description page. The description page is updated to be opened with a page describing the ink state "empty" as an initial screen. The operation of opening the page describing the ink state "empty" is implemented by passing the data "E3000" of the SupportCode element 1016 to the electronic operation manual as a parameter.

As described above, according to the present exemplary embodiment, the printing apparatus 250 can notify all subscribed personal computers 200 of only event notifications of public elements. The printing apparatus 250 can issue an event notification of a private element only within a period requested by an application 301 in a personal computer 200. A private element can be defined to include a detailed status. When the detailed status changes, the printing apparatus 250 can issue an event notification of the private element to only the personal computer 200 that has requested the event notification. As a result, the load of event notifications on the printing apparatus 250 can be significantly reduced. An exemplary embodiment of the present invention produces more effect as the printing apparatus 250 is more sophisticated and the applications 301 in the personal computers 200 need more detailed status information.

A second exemplary embodiment deals with a mode in which GetPrinterElementsRequest is issued not by the ink display application 400 but by the WSD port monitor of the OS. The present exemplary embodiment assumes a situation where the ink display application 400 is a Windows Store Device Application (WSDA) (registered trademark) introduced in Windows (registered trademark) 8. APIs usable by WSDAs are limited by the OS. For example, WSDAs cannot issue GetPrinterElementsRequest. According to the present exemplary embodiment, even applications like WSDAs can provide the effects of an exemplary embodiment of the present invention.

The ink display application 400 according to the present exemplary embodiment differs from that of the first exemplary embodiment in the private element notification start request processing (step S503), the success/failure determination thereof (steps S504 and S507), the private element extraction processing (step S508), and the private element notification end request processing (step S517) illustrated in FIG. 5.

In step S503, the ink display application 400 issues a private element notification start request to the WSD port monitor. Specifically, the private element notification start request processing (step S503) according to the present exemplary embodiment is processing for calling an API of the OS. The ink display application 400 calls the API by setting the element name of the private element and Requirements options as arguments. The ink display application 400 sets "ihv:InkErrorDetails" as the element name of an IHV custom element, and "Id:11111111," "Listener:Requester-Only," and "period:Begin" as the Requirements options. The OS processes this API call, and the WSD port monitor issues the GetPrinterElementsRequest described with reference to FIG. 6A to the printing apparatus 250. In step S503, the ink display application 400 issues the private element notification request via the API. In steps S504 and S507, the ink display application 400 refers to return values of the API and determines the success or failure of the request. The ink display application 400 refers to different return values of the API in steps S504 and S507. In step S504, the ink display application 400 determines whether error information is obtained as a return value of the API. The API returns the error information if a response to GetPrinterElementsRequest issued by the WSD port monitor has not been successfully received from the printing apparatus 250. In step S507, the ink display application 400 refers to GetPrinterElementsResponse which the WSD port monitor has received from the printing apparatus 250, and determines whether the request has been successfully registered. In step S508, the ink display application 400 refers to the private element included in a return value of the API and extracts the private element. In step S517, the ink display application 400 issues a private element notification end request to the WSD port monitor via the API. Specifically, in the present exemplary embodiment, the private element notification end request processing of step S517 is processing for calling an API of the OS. The ink display application 400 calls the API by setting the element name of the private element and Requirements options as arguments. The ink display application 400 sets "ihv:InkErrorDetails" as the element name of the private element, and "Id:11111111," "Listener:RequesterOnly," and "period:End" as the Requirements options. The OS processes this API call, and the WSD port monitor issues the GetPrinterElementsRequest described with reference to FIG. 6C.

According to the present exemplary embodiment described above, the ink display application 400 can obtain element data about event data notified by the printing apparatus 250 via the WSD port monitor. The effects of an exemplary embodiment of the present invention can thus be obtained even if the applications 301 in the personal computer 200 are WSDAs.

A third exemplary embodiment deals with a configuration in which the ink display application 400 sets an expiration time, or time limit, as a private element notification period when issuing a private element notification request. The present exemplary embodiment is intended for situations where the ink display application 400 may be forcibly terminated. When the OS detects abnormality or when the OS ends abruptly, the processing of an application 301 can be forcibly terminated. If forcibly terminated, the ink display application 400 is forced to end processing before issuing a private element notification end request (step S517). Without a chance to receive the private element notification end request (step S517) from the ink display application 400, the printing apparatus 250 continues notifying the personal computer 200 of the private element even after the forced termination of the ink display application 400. The present exemplary embodiment is intended to solve such a problem.

If the processing of a WSDA stagnates for a certain time, the OS forcibly terminates the application. It is important to design WSDAs in consideration of the possibility of forced termination by the OS.

The ink display application 400 according to the present invention differs from that of the first exemplary embodiment in the private element notification start request processing (step S503) and the status request processing (step S509).

FIG. 11 illustrates contents of a private element notification start request issued by GetPrinterElementsRequest according to the present exemplary embodiment. The private element notification start request (step S503) according to the present exemplary embodiment differs from that of the first exemplary embodiment described in FIG. 6A in that the Requirements element 1101 accompanied with the attribute value "period" contains data "60000." The data "60000" indicates the expiration time of the private element notification, i.e., that the printing apparatus 250 should notify the private element for 60 seconds from the reception of GetPrinterElementsRequest of FIG. 11. In the private element notification start request processing (step S503) according to the present exemplary embodiment, the ink display application 400 issues GetPrinterElementsRequest illustrated in FIG. 11 to the printing apparatus 250. While the present exemplary embodiment deals with the case where the private element notification issued by the ink display application 400 has an expiration time of 60 seconds, the expiration time may be arbitrarily set with respect to each application 301.

A private element management table stored in the printing apparatus 250 according to the present exemplary embodiment will be described with reference to FIGS. 14A and 14B. FIG. 14A illustrates the private element management table in which the printing apparatus 250 has received and stored the private element notification start table illustrated in FIG. 11. The private element management table differs from the one described in FIG. 8A in the information set in the period. Specifically, the private element management table contains the value of 60000 in the period 1401. FIG. 14B illustrates the private element management table in which private element notification requests from two different applications with expiration time settings are stored. The private element management table contains the application IDs 1410 "11111111" and "22222222." The private element notification period 1411 for the application ID 1410 "11111111" is 60000 msec left. The private element notification period 1411 for the application ID 1410 "22222222" is 500 msec left.

Figure 12:
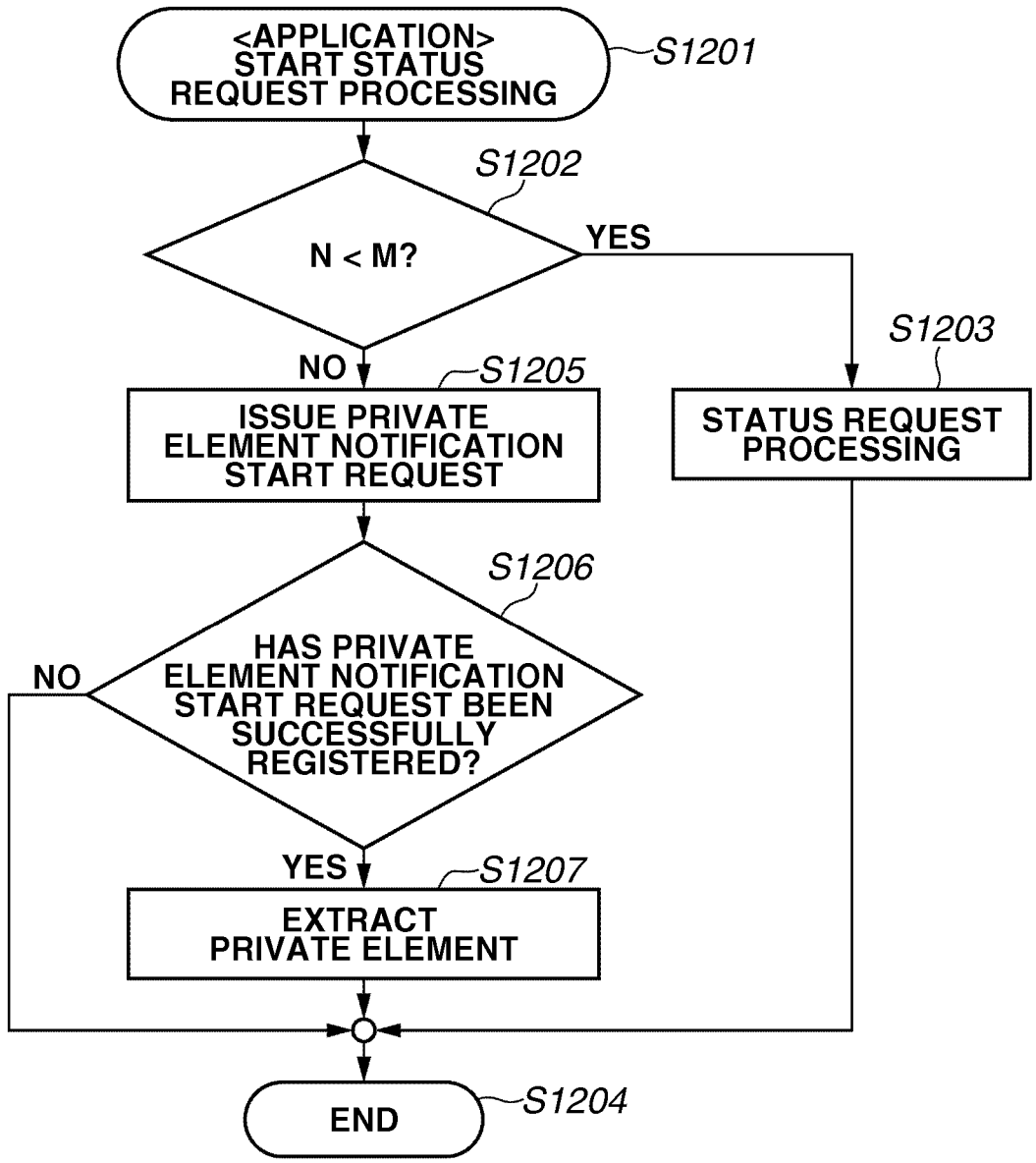
FIG. 12 is a flowchart illustrating status request processing of the remaining ink level display application.

Status request processing according to the present exemplary embodiment will be described with reference to the flowchart of FIG. 12. The ink display application 400 performs the status request processing between step S509 (display of remaining ink levels) and step S511 of FIG. 5. In step S1201, the ink display application 400 starts the status request processing according to the present exemplary embodiment. In step S1202, the ink display application 400 determines whether a time N elapsed since the previous status request processing is less than a time M, which is 50 seconds. In step S1202, if N<M holds (YES in step S1202), then in step S1203, the ink display application 400 performs status request processing. The status request processing of step S1203 is similar to the status request processing of step S509 described with reference to FIG. 5 according to the first exemplary embodiment. In step S1204, the ink display application 400 ends the status request processing according to the present exemplary embodiment.

In step S1202, if N<M does not hold (NO in step S1202), then in step S1205, the ink display application 400 issues a private element notification start request. The contents of the private element notification start request of step S1205 are similar to that of GetPrinterElementsRequest described with reference to FIG. 11. In step S1206, the ink display application 400 determines whether the private element notification start request has been successfully registered. If the registration has failed (NO in step S1206), then in step S1204, the ink display application 400 ends the status request processing. If the private element notification start request has been successfully registered (YES in step S1206), then in step S1207, the ink display application 400 extracts the private element in GetPrinterElementsResponse described in FIG. 6B. In step S1204, the ink display apparatus 400 ends the status request processing. In such a manner, the ink display application 400 can continue obtaining the information about the private element by regularly issuing a private element notification start request (step S1205) to update the expiration time.

Figure 13:
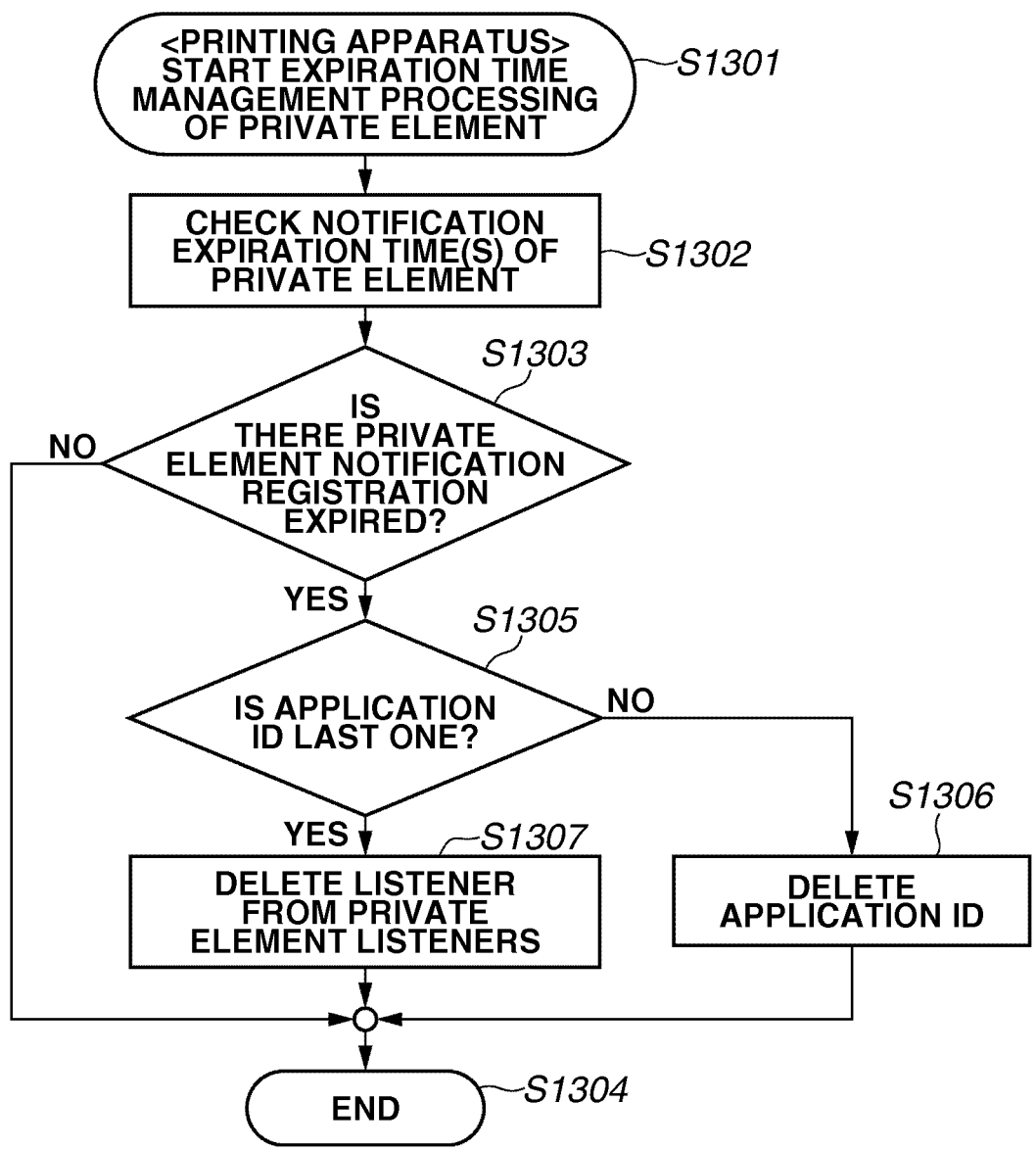
FIG. 13 is a flowchart illustrating expiration time management processing of a private element by the printing apparatus.

FIG. 13 is a flowchart illustrating expiration time management processing of private elements by the printing apparatus 250. The printing apparatus 250 regularly performs the expiration time management processing during operation. In the present exemplary embodiment, the printing apparatus 250 starts the expiration time management processing at every 10 seconds. In step S1301, the printing apparatus 250 starts the expiration time management processing. In step S1302, the printing apparatus 250 refers to the private element management table illustrated in FIGS. 14A and 14B to check the notification expiration time(s) of the private element(s). In the present exemplary embodiment, the printing apparatus 250 performs the expiration time management processing every 10 seconds. The printing apparatus 250 therefore subtracts 10 seconds from the number(s) of seconds stored in the period 1401 (1411) of the private element management table, and stores the resultant again. In step S1303, the printing apparatus 250 determines whether there is a private element notification registration expired. If there is no private element notification registration expired (NO in step S1303), then in step S1304, the printing apparatus 250 ends the expiration time management processing. If there is a private element notification registration(s) expired (YES in step S1303), the printing apparatus 250 proceeds to step S1305 to perform determination processing. In the example of FIG. 14B, the remaining private element notification period of the application ID "22222222" is 500 msec as illustrated in the period 1411. The subtraction of 10 seconds makes the remaining private element notification period less than zero, i.e., expired. In step S1305, the printing apparatus 250 performs the determination processing to determine whether the application ID of the private element listener to be unregistered is the last one in the listener personal computer 200. In the case of FIG. 14B, there are two application IDs stored for the same listener "INFORMATION PROCESSING APPARATUS xxx" (NO in step S1305). Then in step S1306, the printing apparatus 250 performs processing for deleting the application ID. In step S1306, the printing apparatus 250 deletes the application ID "22222222" from the private element management table. In step S1304, the printing apparatus 250 ends the expiration time management processing. In step S1305, if the application ID is only one registered for a certain listener of a private element (YES in step S1305), then in step S1307, the printing apparatus 250 deletes the listener from private element listeners. In step S1304, the printing apparatus 250 ends the expiration time management processing.

According to the present exemplary embodiment described above, the printing apparatus 250 can cancel the notification of a private element when its expiration comes even if the ink display application 400 is abruptly and forcibly terminated without issuing a private element notification end request (step S517). This can solve the problem that the printing apparatus 250 continues notifying the personal computer 200 of the private element. The event notification load of the printing apparatus 250 can be significantly reduced.

A fourth exemplary embodiment deals with a configuration in which a personal computer 200 specifies a processing time of a print job as a private element notification period when issuing a private element notification request.

As an example of applications 301 in the personal computer 200, take a print status monitoring application (to be described below). The print status monitoring application (status monitoring application) is an application for displaying the progress of how far the printing apparatus 250 has processed a print job submitted by an application 301 having a print function in the personal computer 200. The application 301 having a print function in the personal computer 200 transmits a print job to the printing apparatus 250 via a printer driver (device driver) 303.

Figure 15:
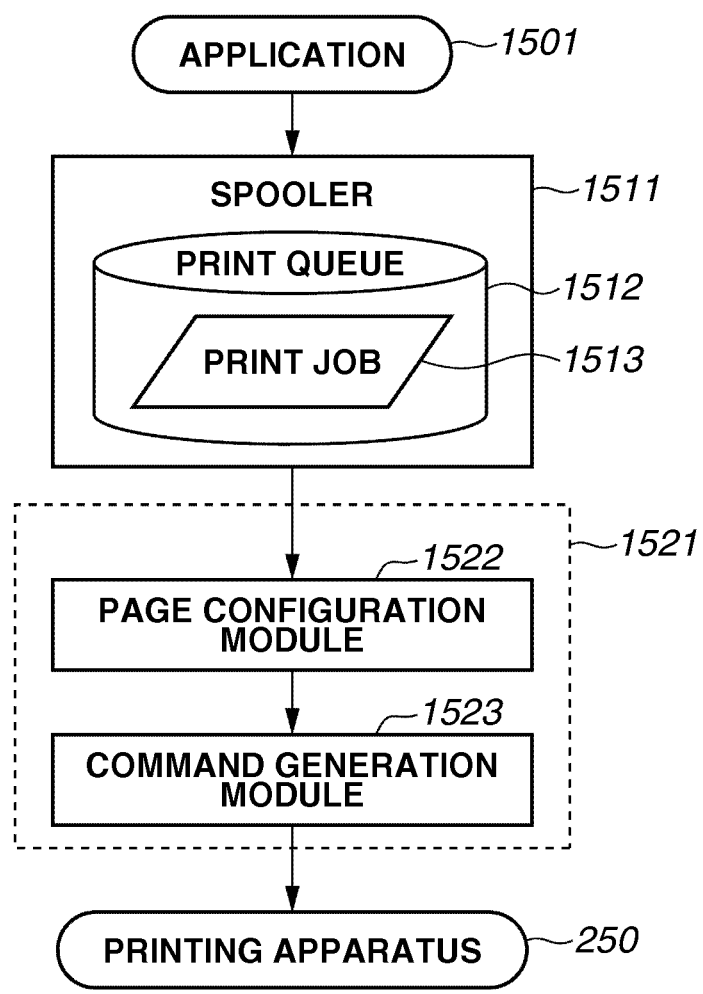
FIG. 15 is a block diagram of a printing system, conceptually illustrating a printing flow.

Referring to FIG. 15, a configuration of the printing system conceptually expressing a printing flow according to the present exemplary embodiment will be described. An application 1501 (an application included in the applications 301) issues a request for print processing to the OS by using an API for making a print instruction, provided by the OS. A spooler 1511 in the OS processes the request for print processing. The spooler 1511 receives a print request from the application 1501, and stores the print request as a print job 1513 in a print queue 1512. The spooler 1511 stores a plurality of print jobs 1513 from a plurality of applications 1501 in the personal computer 200 into the print queue 1512. The spooler 1511 transmits the print jobs 1513 stored in the print queue 1512 to a printer driver 1521 (303) in succession. Receiving a print job 1513, the printer driver 1521 performs page configuration processing by using a page configuration model 1522. Each print job 1513 is accompanied with print setting information specified by the application 1501. The page configuration processing refers to processing for rearranging the order of pages in a single print job 1513 and/or composes a plurality of pages into a single page based on print setting information. After the end of the page configuration processing by the page configuration module 1522, the printer driver 1521 performs processing for converting the print job 1513 into a print data format by using a command generation module 1523. The print data format refers to data interpretable by the printing apparatus 250. After the command generation module 1523 completes the processing for converting the print job 1513 into the print data format, the printer driver 1521 transmits the print job 1513 to the printing apparatus 250. Based on the print job 1513, the printing apparatus 250 performs printing on a recording medium such as a sheet by using recording material such as ink. The printer driver 1521 issues a private element notification request to the printing apparatus 250 here. The private element notification request according to the present exemplary embodiment is information indicating details of the progress of the printing.

FIG. 16A illustrates contents of a private element notification start request which the printer driver 1521 issues by using GetPrinterElementsRequest. A Name element 1601 contains data "ihv:PrintProgressDetails." If the printing apparatus 250 is notified of the data "ihv:PrintProgressDetails," the printing apparatus 250 performs processing for sending back information "ihv:PrintProgressDetails" to the requester (to be described below). A Requirements element 1602 accompanied with attribute information param="Id" contains data (identifier) "33333333." In the present exemplary embodiment, the identifier "33333333" is an identifier representing the printer driver 1521. If the printing apparatus 250 is notified of the data "33333333" by the Requirements element 1602 accompanied with the attribute information "Id," the printing apparatus 250 uses the identifier as information for identifying the application that has requested the notification of the information "ihv:PrintProgressDetails" (to be described below). A Requirements element 1603 accompanied with attribute information param="Listener" contains data "Requester Only." When the printing apparatus 250 is informed of the data "Requester Only" by the Requirements element 1603 accompanied with the attribute "Listener," the printing apparatus 250 stores that only the requester personal computer 200 of the GetPrinterElementsRequest is to be notified of the information "ihv:PrintProgressDetails" by an event notification (to be described below). A Requirements element 1604 accompanied with attribute information param="period" contains data "Printing." If the printing apparatus 250 is notified of the data "Printing" by the Requirements element 1604 accompanied with the attribute "period," the printing apparatus 250 stores that the requester personal computer 200 is to be notified of the information "ihv:PrintProgressDetails" by an event notification only during processing of the print job 1513 (to be described below). The present exemplary embodiment deals with a configuration where the printer driver 1521 issues the private element notification start request of FIG. 16A if the printer driver 1521 recognizes that event data from the printing apparatus 250 includes no PrintProgressDetails element. Instead, the status monitor application may be configured to issue the private element notification start request of FIG. 16A. Other applications 1501 in the OS may be configured to issue the private element notification start request.

Processing in which the printing apparatus 250 receiving the private element notification start request of FIG. 16A registers various types of request information is similar to the private element registration and unregistration processing described with reference to FIG. 7B. Since the private element notification according to the present exemplary embodiment is limited to during printing, the printing apparatus 250 will not be burdened even without cancellation of the private element notification. In the present exemplary embodiment, the printer driver 1521 is therefore configured not to issue a request to cancel the private element notification. Instead, the private element notification is cancelled by unsubscription along with the cancellation of event notification. The application(s) 1501 and/or the printer driver 1521 in the personal computer 200 may be configured to issue the private element notification end request described with reference to FIG. 6C. Receiving the private element notification request, the printing apparatus 250 performs the processing for unregistering the private element notification as described with reference to FIG. 7B.

Contents of GetPrinterElementsResponse which is response information with respect to the private element notification start request will be described with reference to FIG. 16B. The GetPrinterElementsResponse includes a GetPrinterElementsResponse start element 1611. An ElementData start element 1612 is accompanied with a Name attribute and a Valid attribute. The Name attribute has an attribute value indicating that the subsequent XML information is response information with respect to "ihv:PrintProgressDetails." The Valid attribute has an attribute value "true" which indicates that this response information is valid. The ElementData start element 1612 is followed by a PrintProgressDetails start element 1613 and a JobState start element 1614. A JobStatus element 1615 contains data "Receiving." A SupportCode element 1616 contains data "None." A Message element 1617 contains data "Printer has received your print job." wrapped by CDATA tags. A JobName element 1618 contains data "Report.txt" wrapped by CDATA tags. A Progress start element 1619 is followed by a TotalPages element 1620 which contains data "5." A PrintedPages element 1621 contains data "0." A PageState element 1622 contains data "Receiving." Such response information is stored in the storage area S990 as described with reference to FIG. 9.

Figure 17A:
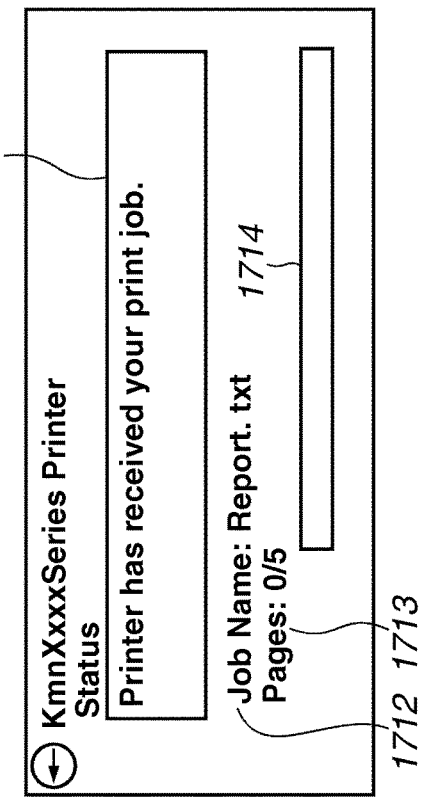
FIGS. 17A, 17B, and 17C are diagrams illustrating a screen of a print status monitoring application.
Figure 17B:
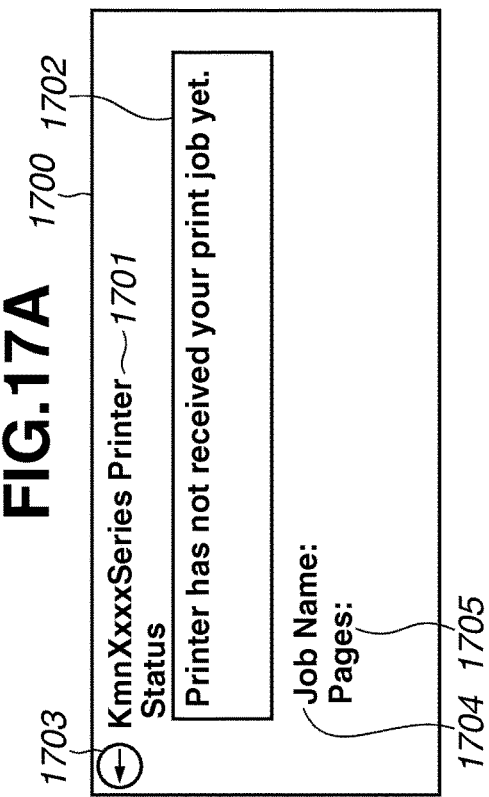
Figure 17C:
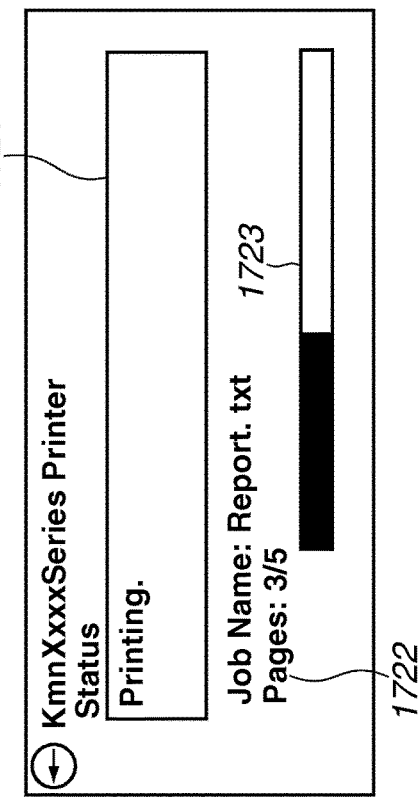

FIGS. 17A, 17B, and 17C are diagrams illustrating the status monitoring application. FIG. 17A illustrates an initial state of the status monitoring application. In the state of FIG. 17A, the printing apparatus 250 is in a status of not performing print processing. The status monitoring application 1700 displays a name 1701 of the printing apparatus 250 to monitor the print status thereof. A status display area 1702 displays that the printing apparatus 250 is not performing print processing. If the user selects an end button 1703, the status monitoring application 1700 ends processing. An area 1704 is intended to display the name of a print job. An area 1705 is intended to display the progress of the print job.

FIG. 17B illustrates a state in which a print status is displayed based on the information in the PrintProgressDetails element 1613 of the response information of FIG. 16B with respect to the private element notification start request. A status display area 1711 displays the data "Printer has received your print job." of the Message element 1617. An area 1712 displays the data "Report.txt" of the JobName element 1618. An area 1713 displays the progress of printing "0/5" based on the data "5" of the TotalPages element 1620 and the data "0" of the PrintedPages element 1621. A progress bar 1714 schematically displays the progress of the printing. Since the printing apparatus 250 is in the process of receiving the print job and not performing print processing, the progress bar 1714 has not advanced.

Figure 18:
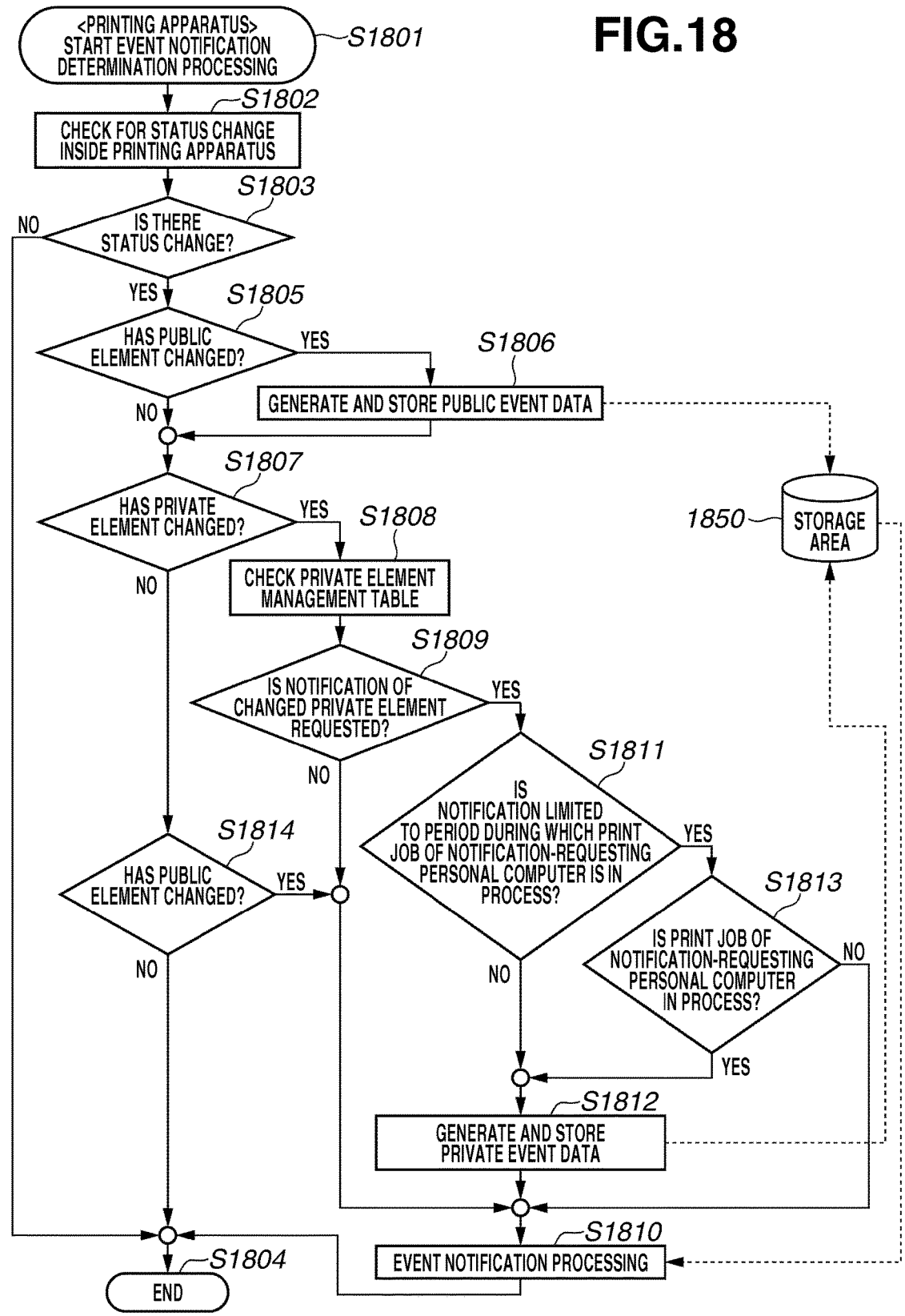
FIG. 18 is a flowchart illustrating event notification determination processing of a printing apparatus.

Event notification determination processing of the printing apparatus 250 will be described with reference to the flowchart of FIG. 18. In step S1801, the printing apparatus 250 starts the event notification determination processing. In step S1802, the printing apparatus 250 checks for a status change inside the printing apparatus 250. In step S1803, the printing apparatus 250 determines whether there is any status change. If there is determined to be no status change (NO in step S1803), then in step S1804, the printing apparatus 250 ends the event notification determination processing. In step S1803, if there is determined to be a status change (YES in step S1803), then in step S1805, the printing apparatus 250 determines whether the changed status is one related to a public element. If a status related to a public element has changed (YES in step S1805), then in step S1806, the printing apparatus 250 generates public event data and stores the public event data in a storage area 1850. In step S1805, if no public element is determined to have changed (NO in step S1805), the printing apparatus 250 proceeds to step S1807 without performing the processing of step S1806. In step S1807, the printing apparatus 250 determines whether a status related to a private element has changed. In step S1807, if a private element has changed (YES in step S1808), then in step S1808, the printing apparatus 250 checks the private element management table (referring to those illustrated in FIGS. 8A, 8B, 14A, and 14B and ones illustrated in FIGS. 19A and 19B to be described below). In step S1809, having checked the private element management table, the printing apparatus 250 determines whether notification of the changed private element is requested. In step S1809, if none of the personal computers 200 ("Listener" in the private element management table) is determined to have requested the notification of the changed private element (NO in step S1809), the printing apparatus 250 proceeds to step S1810. In step S1810 (event notification processing), the printing apparatus 250 reads the event data stored in the storage area 1850, and notifies the subscribed personal computers 200 of the event data by an event notification. In step S1804, the printing apparatus 250 ends the event notification determination processing. In step S1809, if the notification of the changed private element is determined to be requested (YES in step S1809), then in step S1811, the printing apparatus 250 determines whether the notification of the changed private element is limited to a period during which the print job of the notification-requesting personal computer 200 is in process.

A private element management table in which a notification period of "Printing" is set will be described with reference to FIG. 19A. In a registration state 1901, the notification of the InkErrorDetails element is registered with the information processing apparatus xxx as the listener personal computer 200, a duration of 60000 msec as the notification period, and "11111111" as the requesting application ID. In a registration state 1902, the notification of the InkErrorDetails element is registered with the information processing apparatus xxx as the listener personal computer 200, a duration of 500 msec as the notification period, and "22222222" as the requesting application ID. The registration states 1901 and 1902 of the private element notification table are similar to those of FIG. 14B. In a registration state 1903, the notification of the PrintProgressDetails element is registered with the information processing apparatus xxx as the listener personal computer 200, "Printing" as the notification period, and "33333333" as the requesting application ID. The registration state 1903 represents a state where the printer driver 1521 in the information processing apparatus xxx has requested the notification of the PrintProgressDetails element by setting an application ID of "33333333." In a registration state 1904, the notification of the PrintProgressDetails element is registered with an information processing apparatus yyy as the listener personal computer 200, "Printing" as the notification period, and "44444444" as the requesting application ID. The registration state 1904 represents a state where the printer driver 1521 in the information processing apparatus yyy has requested the notification of the PrintProgressDetails element by setting an application ID "44444444." Note that the information processing apparatus xxx is requesting the notification of the InkErrorDetails element and the PrintProgressDetails element. The printing apparatus 250 therefore includes the InkErrorDetails element and the PrintProgressDetails element in the event notification to the information processing apparatus xxx.

In step S1811, if the changed private element is the InkErrorDetails element, the notification period is not "Printing" (NO in step S1811). In such a case, the printing apparatus 250 proceeds to step S1812 to generate private event data. In step S1811, if the changed private element is the PrintProgressDetails element, the notification period is "Printing" (YES in step S1811). In such a case, the printing apparatus 250 proceeds to step S1813 to perform print job source determination processing. In step S1813 (print job source determination processing), the printing apparatus 250 determines whether the source personal computer 200 of the print job currently under print processing is requesting the notification of the PrintProgressDetails element. In step S1813, if a print job transmitted from the information processing apparatus xxx or the information processing apparatus yyy in the private management table of FIG. 19A is in process (YES in step S1813), the printing apparatus 250 proceeds to step S1812 to generate private event data. In step S1813, if a print job transmitted from a personal computer 200 other than the information processing apparatus xxx or the information processing apparatus yyy is in process (NO in step S1813), the printing apparatus 250 proceeds to step S1810 (event notification processing) without performing the processing of step S1812. In step S1804, the printing apparatus 250 ends the event notification determination processing. The event notification processing will be described in detail below with reference to FIG. 20.

In step S1812, the printing apparatus 250 generates and stores private event data in the storage unit 1850.

If public event data already exists in the storage area 1850, the printing apparatus 250 may duplicate the public event data and merge the duplicated public event data with the private event data.

In step S1807, if no private element is determined to have changed (NO in step S1807), then in step S1814, the printing apparatus 250 checks again whether a public element has changed. If a public element is determined to have changed (YES in step S1814), the printing apparatus 250 proceeds to step S1810 to perform the event notification processing. In step S1814, if no public element is determined to have changed (NO in step S1814), then in step S1804, the printing apparatus 250 ends the event notification determination processing. After the event notification processing of step S1810 and before the end of the event notification determination processing in step S1804, the printing apparatus 250 deletes the notified event data from the storage area 1850.

The event notification processing of step S1810 according to the present exemplary embodiment will be described in detail with reference to the flowchart of FIG. 20.

Figure 20:
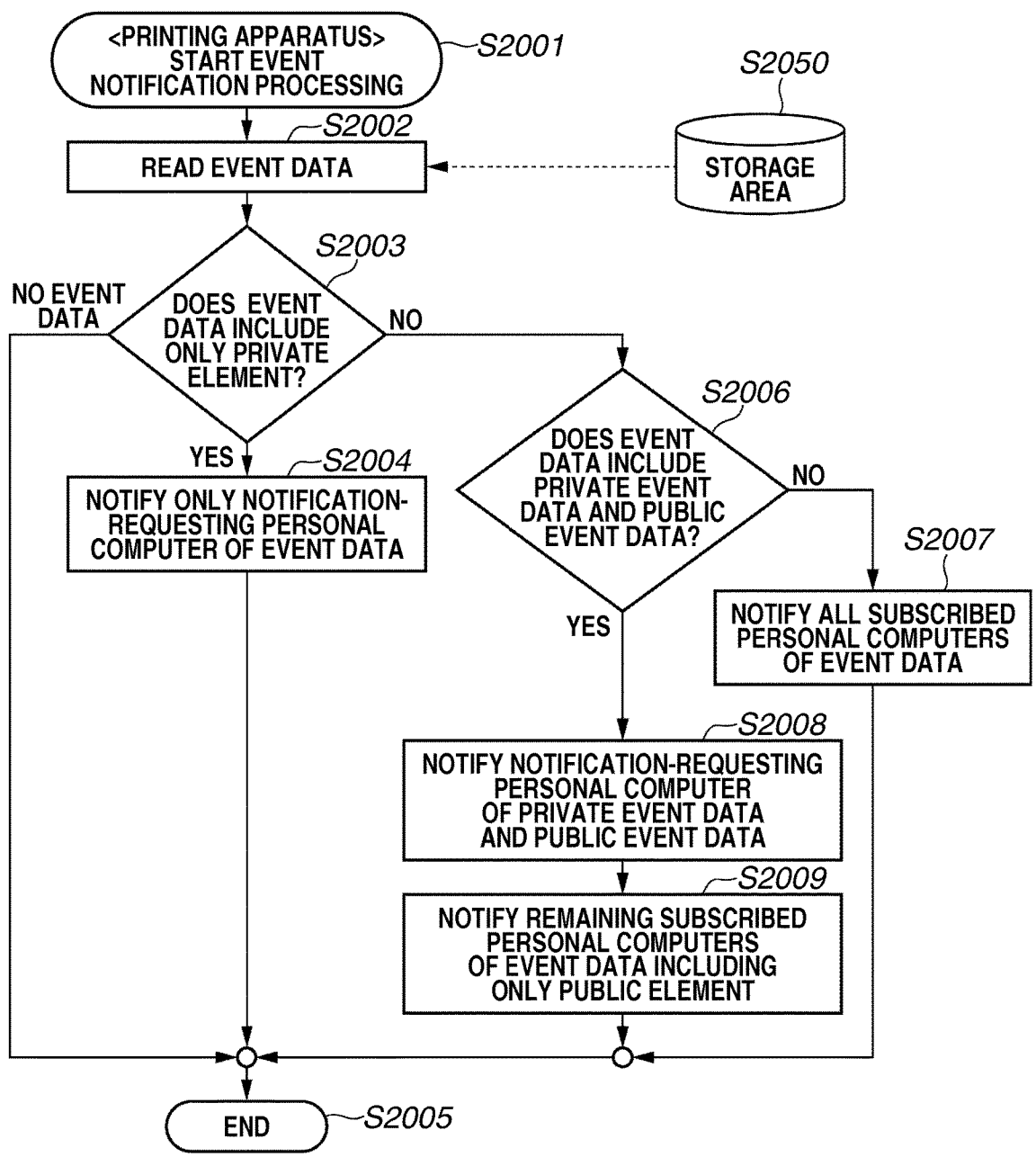
FIG. 20 is a flowchart illustrating event notification processing of a printing apparatus according to a fourth exemplary embodiment.

The printing apparatus 250 may perform the event notification processing illustrated in FIG. 20 at regular time intervals. The printing apparatus 250 may perform the event notification processing at regular time intervals during printing, and may make the time intervals longer than during printing if an error occurs or when the printing apparatus 250 is idle.

In step S2001, the printing apparatus 250 starts the event notification processing. In step S2002, the printing apparatus 250 reads event data from a storage area S2050 (1850). In step S2003, the printing apparatus 250 checks the read event data and determines whether the event data includes only a private element. In step S2003, if no event data is stored in the storage area S2050 (NO EVENT DATA in step S2003), then in step S2005, the printing apparatus 250 ends the event notification processing. In step S2003, if the event data is determined to include only a private element (YES in step S2003), then in step S2004, the printing apparatus 250 notifies the event data to only the personal computer 200 requesting the notification of the private element. In step S2005, the printing apparatus 250 ends the event notification processing. In step S2003, if a public element is also determined to be stored in the storage area S2050 (NO in step S2003), then in step S2006, the printing apparatus 250 determines whether the event data includes private event data. In step S2006, if the event data is determined to include no private event data (NO in step S2006), then in step S2007, the printing apparatus 250 notifies all the subscribed personal computers 200 of the event data. In step S2005, the printing apparatus 250 ends the event notification processing. In step S2006, if both private event data and public event data are stored (YES in step S2006), then in step S2008, the printing apparatus 250 notifies the public event data and the private event data to the personal computer 200 requesting the notification of the private element.

The public event data may have been merged with the private event data in step S1812. In such a case, in step S2008, the printing apparatus 250 may notify the requesting personal computer 200 of the merged data.

In step S2009, the printing apparatus 250 notifies the event data including only the public element to the personal computer(s) 200 not requesting the notification of the private element among all the subscribed personal computers 200. In step S2005, the printing apparatus 250 ends the event notification processing. In such a manner, if a status related to a private element has changed, the printing apparatus 250 can issue an event notification including the private element to the personal computer 200 requesting the notification of the private element.

Note that in step S2008, the printing apparatus 250 determines whether to notify the event data to even the notification-requesting personal computer 200 by referring to the information registered in the private element management table (FIGS. 8A, 8B, 14A, 14B, 19A, and 19B). In the present exemplary embodiment, the notification of the private element is requested to be made only during the "Printing" period. More specifically, if the print job from the requesting personal computer 200 is not in process, the printing apparatus 250 notifies the personal computer 200 of the event data not including the private element.

Contents of PrinterElementsChangeEvent data for the printing apparatus 250 to notify when the PrintProgressDetails element has changed will be described with reference to FIG. 10D. The PrinterElementsChangeEvent data includes a PrinterElementsChangeEvent start element 1021. The PrinterElementsChangeEvent start element 1021 is followed by a PrintProgressDetails start element 1022. A JobStatus element 1023 contains data "Processing." The data "Processing" shows that the printing apparatus 250 is processing a print job 1513. A Message element 1024 contains data "Printing." wrapped by CDATA tags. A PrintedPages element 1025 contains data "2." The data of the PrintedPages element 1025 indicates the number of pages already printed by the printing apparatus 250. A PageState element 1026 contains data "Ejecting." The data "Ejecting" shows that the printing apparatus 250 is in the process of ejecting a recording medium.

FIG. 17C illustrates a state in which the print status is displayed based on the information about the PrintProgressDetails element of FIG. 10D. A status display area 1721 displays the data "Printing" of the Message element 1024. An area 1722 displays the progress of printing "3/5" based on the data "2" of the PrintedPages element 1025. A progress bar 1723 is displayed to have advanced by ⅖ of the entire progress of printing based on the data "2" of the PrintedPages element 1025, and further by ⅔₁₅ of the entire progress of printing based on the data "Ejecting" of the PageState element 1026. In the present exemplary embodiment, a page of progress bar is divided into three portions including "Loading," "Printing," and "Ejecting." "Loading" represents that the printing apparatus 250 is feeding a recording medium. "Printing" represents that the printing apparatus 250 is performing print processing. "Ejecting" represents that the printing apparatus 250 is ejecting a recording medium.

According to the present exemplary embodiment described above, when a print job 1513 is transmitted from a personal computer 200, the printing apparatus 250 notifies the personal computer 200 of a private element only during processing of the print job 1513. The printing apparatus 250 will not notify the other personal computer(s) 200 of the private element. This can significantly reduce the load of the event notification on the printing apparatus 250.

A fifth exemplary embodiment deals with a configuration in which the printing apparatus 250 collectively notifies changes of a private element occurring in an arbitrary period. The present exemplary embodiment is directed to further reducing the processing for notifying a private element when a status change occurs frequently in the printing apparatus 250. For example, if the printing apparatus 250 has high printing speed, the data of the PageState element 1026 in the PrintProgressDetails element 1022 of FIG. 10D changes frequently. For example, suppose that the data of the PageState element 1206 is defined to include three page processing states "Loading," "Printing," and "Ejecting." In such a case, the event notification load of the printing apparatus 250 is high because the printing apparatus 250 needs to notify an event including the PrintProgressDetails element 1022 at short time intervals. If the data of the PrintProgressDetails element 1022 changes frequently in the printing apparatus 250, the printing apparatus 250 may be able to freely aggregate the event data. However, some personal computers 200 may need the frequent change information about the event data depending on their roles. The printing apparatus 250 therefore cannot arbitrarily determine whether to aggregate the event data. The present exemplary embodiment is intended to solve such a problem.

FIG. 16C illustrates contents of a private element notification start request which the status monitoring application 1700 issues by using GetPrinterElementsRequest. While the fourth exemplary embodiment has dealt with the configuration in which the printer driver 1521 issues a private element notification start request, the present exemplary embodiment deals with a configuration in which the status monitoring application 1700 issues a private element notification start request. The status monitoring application 1700 performs start processing and issues the private element notification start request illustrated in FIG. 16C. A Name element 1631 contains data "ihv:PrintProgressDetails." A Requirements element 1632 accompanied with attribute information param="Id" contains data (identifier) "44444444." In the present exemplary embodiment, the identifier "44444444" is an identifier representing the status monitoring application 1700. A Requirements element 1633 accompanied with attribute information param="delay" contains data "3000." If the printing apparatus 250 is notified of the data "3000" by the Requirements element 1633 accompanied with the "delay" attribute, the printing apparatus 250 stores aggregation permission information that the event notification of the PrintProgressDetails element 1631 may be aggregated for a period of 3000 msec.

FIG. 19B illustrates a private element management table that the printing apparatus 250 having received the private element notification request of FIG. 16C registers. In a registration state 1911, the notification of the PrintProgressDetails element is registered with the information processing apparatus yyy as the listener personal computer 200, "Printing" as the notification period, and "44444444" as the requesting application ID. In the registration state 1911, aggregation permission information "3000" is also registered.

Figure 1:
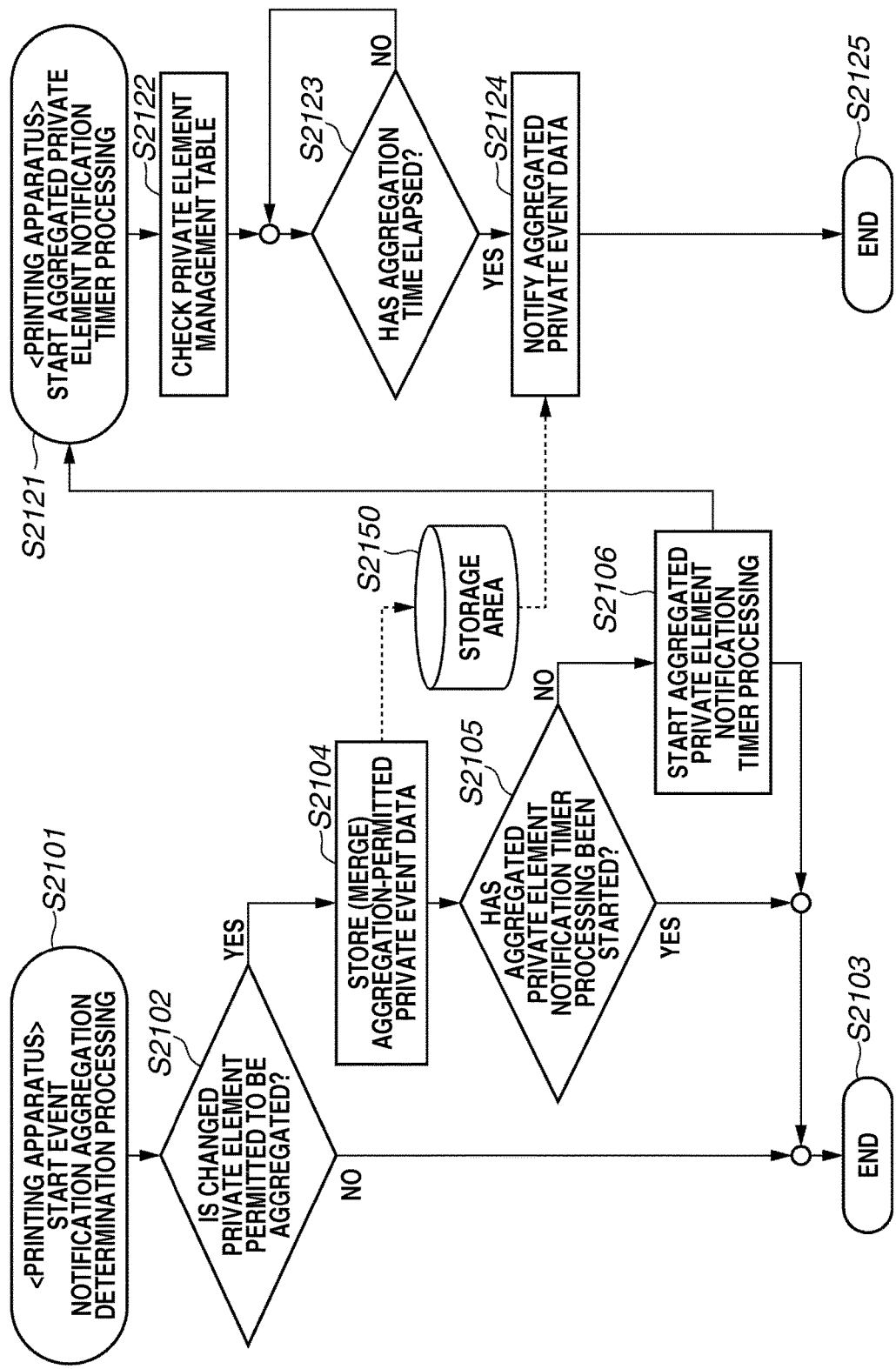
FIG. 1 is a flowchart illustrating event notification aggregation determination processing and aggregated private element notification timer processing of a printing apparatus.

FIG. 1 illustrates event notification aggregation determination processing and aggregated private element notification timer processing of the printing apparatus 250. The event notification aggregation determination processing will be initially described. The printing apparatus 250 performs the event notification aggregation determination processing before the processing of step S1812 in FIG. 18. In step S2101, the printing apparatus 250 starts the event notification aggregation determination processing. In step S2102, the printing apparatus 250 refers to the private element management table illustrated in FIG. 19B and determines whether the changed private element is permitted to be aggregated. In step S2102, if the changed private element is determined not to be permitted to be aggregated (NO in step S2102), then in step S2103, the printing apparatus 250 ends the event notification aggregation determination processing. In step S2102, if the changed private element is determined to be permitted to be aggregated (YES in step S2102), then in step S2104, the printing apparatus 250 stores the aggregation-permitted private event data in a storage area S2150 (1850, S2050). If the same private element data already exists, then in step S2104, the printing apparatus 250 merges the private event data with the existing private element. In step S2105, the printing apparatus 250 determines whether the aggregated private element timer processing has been started. In step S2105, if the aggregated private element notification timer processing is determined to have been started (YES in step S2105), then in step S2103, the printing apparatus 250 ends the event notification aggregation determination processing. In step S2105, if the aggregated private element timer processing is determined not to have been started (NO in step S2105), then in step S2106, the printing apparatus 250 starts the aggregated private element notification timer processing. In step S2103, the printing apparatus 250 ends the event notification aggregation determination processing.

In step S1812, the printing apparatus 250 will not store the aggregation-permitted private element since the aggregation-permitted private element was already stored in the storage area S2150 in step S2104. In step S1810, the printing apparatus 250 will not make an event notification of the event data including only the aggregation-permitted private element. Instead, the printing apparatus 250 notifies the event data in step S2124 to be described below. Note that the printing apparatus 250 notifies event data including the aggregation-permitted element in step S1810 if the event data includes other private and/or public elements.

Next, the aggregated private element notification timer processing will be described. In step S2121, the printing apparatus 250 starts the aggregated private element notification time processing. In step S2122, the printing apparatus 250 checks the private element management table illustrated in FIG. 19B. The printing apparatus 250 recognizes that an aggregation time of the aggregated private element is 3000 msec. In step S2123, the printing apparatus 250 repeats aggregation time lapse determination processing until the aggregation time has elapsed. In step S2123, if the aggregation time is determined to have elapsed (YES in step S2123), then in step S2124, the printing apparatus 250 reads the aggregated private event data from the storage area S2150, and notifies the notification-requesting personal computer 200 of the aggregated private event data. In step S2125, the printing apparatus 250 ends the aggregated private element notification timer processing. In step S2124, if no aggregated private element exists in the storage area S2150 yet, then in step S2125, the printing apparatus 250 ends the aggregated private element notification timer processing without performing the processing for notifying the event data in step S2124.

According to the present exemplary embodiment described above, a personal computer 200 can notify the printing apparatus 250 of a permission to aggregate a private element. This eliminates the need for the printing apparatus 250 to make immediate event notifications even if a status change occurs frequently. As a result, the event notification load of the printing apparatus 250 can be significantly reduced. On the other hand, if a personal computer 200 is intended to obtain a status change frequently, the personal computer 200 does not notify the printing apparatus 250 of the permission to aggregate the private element. In such a manner, the personal computer 200 intended to monitor frequent status changes can appropriately obtain information about the private element.

In the first to fifth exemplary embodiments, the event data has been described by using an ink error and print progress as examples.

Other examples of information to be included in the event data may include information indicating a paper-out condition, information indicating a paper-out sheet feed stage (cassette), information indicating a sheet volume, information indicating the amount of buffered jobs, and information about a job queue.

Event data may include information about a medium. Public event data may be configured to include information about a medium type. Private event data may be configured to include information about a model number of a medium.

The first to fifth exemplary embodiments have dealt with the mode in which GetPrinterElementsRequest of the WSD Print Service of the personal computers 200 is used as the unit of private element notification start and end requests. However, IHV native protocols may be used instead of the WSD Print Service.

An exemplary embodiment of the present invention may be achieved by providing a system or an apparatus with a storage medium in which software program code for implementing the functions of the foregoing exemplary embodiments is recorded, and reading and executing the program code stored in the recording medium by a computer (or CPU or micro processing unit (MPU)) of the system or apparatus. In such a case, the program code itself read from the recording medium implements the functions of the foregoing exemplary embodiments. The recording medium storing the program code constitutes an exemplary embodiment of the present invention.

Examples of the recording medium for providing the program code include a flexible disk, a hard disk, an optical disk, a magneto-optical disk, a compact disc read-only memory (CD-ROM), a compact disc recordable (CD-R), a magnetic tape, a nonvolatile memory card, a ROM, and a digital versatile disc (DVD).

The functions of the foregoing exemplary embodiments need not necessarily be implemented by the computer reading and executing the program code. An OS running on the computer may perform part or all of actual processing based on an instruction or instructions from the program code so that the functions of the foregoing exemplary embodiments are implemented by the processing.

The program code read from the recording medium may be written to a memory provided on a function expansion board inserted into the computer or a function expansion unit connected to the computer. Then, a CPU provided on the function expansion board or the function expansion unit may perform part or all of actual processing based on an instruction or instructions from the program code so that the functions of the foregoing exemplary embodiments are implemented by the processing.

According to the exemplary embodiments described above, the period of notification of a private element and its listener personal computer 200 can be limited even if there are personal computers 200 registered for event notifications. This can significantly reduce the event notification load of the printing apparatus 250.

According to the exemplary embodiments of the present invention, when the device notifies a plurality of information processing apparatuses including a specific information processing apparatus of information, the device notifies the specific information processing apparatus of specific information without notifying the information processing apparatus(es) other than the specific information processing apparatus of the specific information. This can reduce the load of the information processing apparatus(es) other than the specific processing apparatus in processing the specific information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2013-006149 filed Jan. 17, 2013, which is hereby incorporated by reference herein in its entirety.

What is claimed is:

1. A system comprising:
a device, and
at least one information processing apparatus having a processor,
wherein the processor is configured to request a notification registration for a public event,
the processor is configured to request a notification registration for a private event, and
the processor is configured to requests cancellation of the notification registration, when operation of the information processing apparatus ends,
wherein the device comprises
a notification unit configured to notify the information processing apparatus of at least one of the private event and the public event based on the notification registration for the public event and the notification registration for the private event,
wherein if a first information processing apparatus requests the notification registration for a public event and the notification registration for a private event related to the device, and a second information processing apparatus requests the notification registration for the public event, the notification unit notifies the first information processing apparatus of the public event and the private event, and notifies the second information processing apparatus of the public event, without notifying the second information processing apparatus of the private event,
wherein the device includes a management unit configured to manage, as a listener, a first application of the first information processing apparatus and a second application of the first information processing apparatus,
wherein if both of the first application and the second application request cancellation of the notification registration, the notification unit stops notifying the first information processing apparatus of the private event, and
wherein if at least one of the first application and the second application does not request cancellation of the notification registration, the notification unit performs notifying the first information processing apparatus of the private event.

2. The system according to claim 1, wherein the management unit manages a first expiration time of the first application and a second expiration time of the second application, and
wherein if both of the first expiration time and the second expiration time are expired, the notification unit stops notifying the first information processing apparatus of the private event.

3. The system according to claim 1 further comprising
a determination unit configured to determine whether a plurality of private events are permitted to be aggregated, and
a expiration determination unit configured to, if it is determined that the plurality of private events are permitted to be aggregated, determine whether an aggregation time has elapsed,
wherein if it is determined that the aggregation time has elapsed, the notification unit notifies the first information processing apparatus of an aggregated event in which the plurality of private events are aggregated.

4. The system according to claim 3, wherein the information processing apparatus further comprises an aggregation request unit configured to request a permission for the aggregation.

5. The system according to claim 1, wherein the private event and the public event include information concerning a remaining ink amount.

6. A device capable of communicating with an information processing apparatus which requests a notification registration for a public event, requests a notification registration for a private event, and requests cancellation of the notification registration when operation of the information processing apparatus ends, the device comprising:
at least one processor operating to:
notify the information processing apparatus of at least one of the private event and the public event based on the notification registration for the public event and the notification registration for the private event,
wherein if a first information processing apparatus requests the notification registration for a public event and the notification registration for a private event related to the device, and a second information processing apparatus requests the notification registration for the public event, the at least one processor notifies the first information processing apparatus of the public event and the private event, and notifies the second information processing apparatus of the public event without notifying the second information processing apparatus of the private event; and manage, as a listener, a first application of the first information processing apparatus and a second application of the first information processing apparatus, wherein if a cancellation request of the notification registration from both of the first application and the second application is received, the at least one processor stops notifying the first information processing apparatus of the private event, and wherein if a cancellation request of the notification registration from at least one of the first application and the second application is not received, the at least one processor performs notifying the first information processing apparatus of the private event.

7. The device according to claim 6, wherein a first expiration time of the first application and a second expiration time of the second application are managed, and wherein if both of the first expiration time and the second expiration time are expired, the at least one processor stops notifying the first information processing apparatus of the private event.

8. The device according to claim 6, wherein the at least one processor operates to determine whether a plurality of private events are permitted to be aggregated, and wherein if it is determined that the plurality of private events are permitted to be aggregated, the at least one processor operates to determine whether an aggregation time has elapsed, wherein if it is determined that the aggregation time has elapsed, the at least one processor notifies the first information processing apparatus of an aggregated event in which the plurality of private events are aggregated.

9. A method for controlling a device capable of communicating with an information processing apparatus which requests a notification registration for a public event, requests a notification registration for a private event, and requests cancellation of the notification registration when operation of the information processing apparatus ends, the method comprising:

notifying the information processing apparatus of at least one of the private event and the public event based on the notification registration for the public event and the notification registration for the private event, wherein if a first information processing apparatus requests the notification registration for a public event and the notification registration for a private event related to the device, and a second information processing apparatus requests the notification registration for the public event, at least one processor notifies the first information processing apparatus of the public event and the private event, and notifies the second information processing apparatus of the public event without notifying the second information processing apparatus of the private event; and managing, as a listener, a first application of the first information processing apparatus and a second application of the first information processing apparatus, wherein if a cancellation request of the notification registration from both of the first application and the second application is received, the notifying of the first information processing apparatus of the private event is stopped, wherein if a cancellation request of the notification registration from at least one of the first application and the second application is not received, the notifying of the first information processing apparatus of the private event is performed.

10. The method according to claim 9, wherein the managing includes a first expiration time of the first application and a second expiration time of the second application, and wherein if both of the first expiration time and the second expiration time are expired, the notifying of the first information processing apparatus of the private event, stops.

11. The method according to claim 9, further comprising, determining whether a plurality of private events are permitted to be aggregated, wherein if it is determined that the plurality of private events are permitted to be aggregated, whether an aggregation time has elapsed is determined, wherein if it is determined that the aggregation time has elapsed, the first information processing apparatus is notified of an aggregated event in which the plurality of private events are aggregated.

\* \* \* \* \*